United States Patent
Wang et al.

(10) Patent No.: US 10,763,709 B2
(45) Date of Patent: Sep. 1, 2020

(54) STATOR ASSEMBLY, ELECTRIC PUMP HAVING STATOR ASSEMBLY, AND METHOD FOR MANUFACTURING STATOR ASSEMBLY

(71) Applicant: Zhejiang Sanhua Automotive Components Co., LTD., Hangzhou, Zhejiang (CN)

(72) Inventors: Hongwei Wang, Zhejiang (CN); Junfeng Bao, Zhejiang (CN); Qiang Ning, Zhejiang (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 343 days.

(21) Appl. No.: 15/412,483

(22) Filed: Jan. 23, 2017

(65) Prior Publication Data
US 2017/0222496 A1 Aug. 3, 2017

(30) Foreign Application Priority Data
Jan. 29, 2016 (CN) .......................... 2016 1 0066079
Jan. 29, 2016 (CN) .......................... 2016 1 0070324

(51) Int. Cl.
*H02K 1/14* (2006.01)
*H02K 3/18* (2006.01)
(Continued)

(52) U.S. Cl.
CPC ............. *H02K 1/146* (2013.01); *F04D 13/06* (2013.01); *H02K 1/148* (2013.01); *H02K 3/18* (2013.01);
(Continued)

(58) Field of Classification Search
CPC .... H02K 1/08; H02K 1/14; H02K 1/146; H02K 1/148; H02K 1/18; H02K 3/18;
(Continued)

(56) References Cited

U.S. PATENT DOCUMENTS 5,604,971 A * 2/1997 Steiner ................ H01F 41/0233
29/596
5,876,518 A * 3/1999 Hasegawa ............. H01F 41/026
148/302
(Continued)

FOREIGN PATENT DOCUMENTS

CN 104600882 A 5/2015
CN 204741349 U 11/2015
(Continued)

OTHER PUBLICATIONS

Ochi, Machine Translation of JP2001178031, Jun. 2001 (Year: 2001).*
(Continued)

*Primary Examiner* — Quyen P Leung
*Assistant Examiner* — Eric Johnson
(74) *Attorney, Agent, or Firm* — Boyle Fredrickson S.C.

(57) ABSTRACT

A stator assembly includes a stator core. The stator core includes a yoke and teeth. Each of the teeth includes a neck and a tip. The neck includes a first stacking portion, a second stacking portion, a first plane and a second plane. The first stacking portion and the second stacking portion are arranged opposite to each other, and the first plane and the second plane are arranged opposite to each other. The first stacking portion and the second stacking portion are formed by stacking silicone steel sheets of the neck, and the first plane and the second plane are outer surfaces of silicone steel sheets at two terminal ends of the neck in a stacking direction.

15 Claims, 21 Drawing Sheets

(51) Int. Cl.
    *H02K 15/02* (2006.01)
    *F04D 13/06* (2006.01)
    *H02K 11/30* (2016.01)
(52) U.S. Cl.
    CPC ........... *H02K 15/024* (2013.01); *H02K 11/30* (2016.01); *H02K 2213/03* (2013.01)
(58) Field of Classification Search
    CPC .... H02K 15/02; H02K 15/022; H02K 15/024; H02K 15/12; F04D 13/06
    USPC ....... 310/43, 44, 216.004, 216.007, 216.011, 310/216.016, 216.018, 216.019, 216.045, 310/216.057, 216.062, 216.079, 310/216.081–216.089, 216.098
    See application file for complete search history.

(56) References Cited

U.S. PATENT DOCUMENTS

| | | | | |
|---|---|---|---|---|
| 6,140,726 | A * | 10/2000 | Suzuki | H02K 1/145 310/216.055 |
| 7,884,522 | B1 * | 2/2011 | Petro | H02K 1/14 310/216.072 |
| 2006/0202586 | A1 * | 9/2006 | Shim | H02K 1/146 310/216.067 |
| 2006/0214533 | A1 * | 9/2006 | Miyashita | H02K 29/03 310/216.004 |
| 2008/0036310 | A1 * | 2/2008 | Marioni | H02K 21/16 310/41 |
| 2009/0001824 | A1 * | 1/2009 | Marioni | H02K 1/148 310/400 |
| 2009/0026873 | A1 | 1/2009 | Matsuo et al. | |
| 2009/0108699 | A1 * | 4/2009 | Li | H02K 1/148 310/216.009 |
| 2013/0249328 | A1 | 9/2013 | Dokonal et al. | |
| 2013/0263439 | A1 | 10/2013 | Brandau et al. | |
| 2014/0042866 | A1 | 2/2014 | Zhao et al. | |
| 2015/0042194 | A1 * | 2/2015 | Li | H02K 21/16 310/156.01 |
| 2015/0052934 | A1 * | 2/2015 | Aso | F04D 13/064 62/467 |
| 2015/0069878 | A1 | 3/2015 | Hattori et al. | |
| 2016/0204662 | A1 * | 7/2016 | Hoppach | H02K 1/148 310/156.48 |

FOREIGN PATENT DOCUMENTS

| | | | | |
|---|---|---|---|---|
| EP | 1 701 427 | A1 | | 9/2006 |
| EP | 2 006 976 | A1 | | 12/2008 |
| EP | 2590302 | A1 * | 5/2013 | ............. F04D 13/06 |
| JP | 2001178031 | A * | 6/2001 | |
| JP | 2002345190 | A | | 11/2002 |
| JP | 3406812 | B2 | | 5/2003 |
| JP | 2010-130842 | | | 6/2010 |
| JP | 2010130842 | A | | 6/2010 |

OTHER PUBLICATIONS

EP Search Report from EP 18 17 9555 dated Sep. 19, 2018.
CN Office Action in CN App. No. 201610070324.1 dated Mar. 12, 2019.
CN Office Action in CN App. No. 201610066079.7 dated Apr. 3, 2019.

* cited by examiner

STATOR ASSEMBLY, ELECTRIC PUMP HAVING STATOR ASSEMBLY, AND METHOD FOR MANUFACTURING STATOR ASSEMBLY

CROSS-REFERENCE TO RELATED APPLICATIONS

The present application claims the benefit of priority to Chinese patent application No. 201610066079.7 titled "STATOR ASSEMBLY, AND, MOTOR AND ELECTRIC PUMP HAVING THE SAME", filed with the Chinese State Intellectual Property Office on Jan. 29, 2016, and Chinese patent application No. 201610070324.1 titled "STATOR ASSEMBLY, AND, MOTOR AND ELECTRIC PUMP HAVING THE SAME", filed with the Chinese State Intellectual Property Office on Jan. 29, 2016, the entire disclosures of which are incorporated herein by reference.

FIELD

This application relates to a direct circuit brushless motor, and particularly to a motor component.

BACKGROUND

A motor includes a stator and a rotor. The stator includes a stator core and a stator winding. The stator generates a magnetic field which changes regularly after the winding is energized, and the rotor includes a permanent magnetic material, and the rotor may be rotated in the magnetic field generated by the stator. The stator core includes a yoke and teeth. The stator winding is wound on each of the teeth, and the shape of each of the teeth effects the winding of the stator winding, and further effects the distribution of the magnetic field generated by the stator, and further effects the efficiency of the motor.

Thus, it is necessary to have the conventional technology improved so as to address the above technical issues.

SUMMARY

A stator assembly is provided by the present application, which facilitates manufacturing and improves the efficiency of the motor.

A technical solution is adopted according to the present application. A stator assembly includes a stator core and a winding. The stator core includes teeth and a yoke. The yoke includes an inner circumferential surface and an outer circumferential surface, and the teeth are arranged and distributed along the inner circumferential surface or the outer circumferential surface of the yoke. The stator core is formed by stacked silicon steel sheets. Each of the teeth includes a neck and a tip. Two ends of the neck are respectively connected to the yoke and the tip. The neck provides support for the winding. The neck includes a first stacking portion, a second stacking portion, a first plane portion and a second plane portion. The first stacking portion and the second stacking portion are arranged opposite to each other, and the first plane portion and the second plane portion are arranged opposite to each other. The first stacking portion and the second stacking portion are formed by stacking silicon steel sheets of the neck. In a stacking direction of the neck, the first plane portion and the second plane portion are outer surfaces of silicon steel sheets located at two terminal ends of the neck; in the stacking direction of the silicon steel sheets of the neck, and from the first plane portion and/or the second plane portion to the middle of the winding portion in a height direction, the widths of the silicon steel sheets gradually increase to allow the first stacking portion and the second stacking portion to be in an arc-like shape; a furthest distance from the first stacking portion to the second stacking portion is a first distance W, and a distance between the first plane portion and the second plane portion is a second distance H, and the ratio of the second distance to the first distance is greater than or equal to ½ and smaller than or equal to 1.

An electric pump includes a stator assembly, a housing, a rotor assembly, a stator assembly, and an electric control board. The housing forms an inner cavity, the rotor assembly and the stator assembly are arranged in the inner cavity, the rotor assembly and the stator assembly are separated from each other by the housing, the stator assembly is arranged around the rotor assembly, the electric control board is arranged to be electrically connected to the stator assembly, and the stator assembly includes a stator core, and a winding. The stator core comprises teeth and a yoke, and the yoke comprises an inner circumferential surface and an outer circumferential surface, and the teeth are arranged and distributed along the inner circumferential surface or the outer circumferential surface of the yoke. The stator core is formed by stacked silicon steel sheets, and each of the teeth comprises a neck and a tip, and two ends of the neck are respectively connected to the yoke and the tip. The neck provides support for the winding, and the neck comprises a first stacking portion, a second stacking portion, a first plane portion and a second plane portion, and the first stacking portion and the second stacking portion are arranged opposite to each other, the first plane portion and the second plane portion are arranged opposite to each other, and the first stacking portion and the second stacking portion are formed by stacking silicon steel sheets of the neck. In a stacking direction of the neck, the first plane portion and the second plane portion are outer surfaces of silicon steel sheets located at two terminal ends of the neck. In the stacking direction of the silicon steel sheets of the neck, and from the first plane portion and/or the second plane portion to the middle of the winding portion in a height direction, the widths of the silicon steel sheets gradually increase to allow the first stacking portion and the second stacking portion to be in an arc-like shape. A furthest distance from the first stacking portion to the second stacking portion is a first distance (W), a distance between the first plane portion and the second plane portion is a second distance (H), and the ratio of the second distance to the first distance is greater than or equal to ½ and smaller than or equal to 1.

A method for manufacturing a stator assembly, in which the stator assembly includes a stator core and a winding, and the stator core comprises teeth and a yoke, and the yoke comprises an inner circumferential surface and an outer circumferential surface, and the teeth are arranged and distributed along the inner circumferential surface or the outer circumferential surface of the yoke, and the stator core is formed by stacked silicon steel sheets, and each of the teeth comprises a neck and a tip, and two ends of the neck are respectively connected to the yoke and the tip, and the neck provides support for the winding, and the neck comprises a first stacking portion, a second stacking portion, a first plane portion and a second plane portion, and the first stacking portion and the second stacking portion are arranged opposite to each other, the first plane portion and the second plane portion are arranged opposite to each other, and the first stacking portion and the second stacking portion are formed by stacking silicon steel sheets of the neck, includes a forming process of the stator assembly includes: forming a yoke comprises blanking a plurality of first silicon steel sheets of the yoke and stacking and riveting the plurality of first silicon steel sheets, forming teeth comprises blanking a plurality of second silicon steel sheets of a neck and stacking and riveting the plurality of second silicon steel sheets, and blanking a plurality of third silicon steel sheets of a tip and stacking and riveting the plurality of third silicon steel sheets, forming a stator core comprises injection molding the yoke and the teeth by an insulating layer.

Compared with the conventional technology, the stator assembly according to the present application forms an arc portion in the neck, and the neck is substantially in a circular shape, thus, on the premise that the cross sectional area of the neck is unchanged, the neck may have a reduced perimeter, and the winding wound on the neck may have a reduced length, the manufacturing cost may be lowered, and the copper consumption may be reduced. Further, the stator core according to the present application employs silicon steel sheets, which may further reduce the manufacturing cost. The present application further discloses a motor and an electric pump applying the stator assembly, which facilitates improving the motor power of the motor and the electric pump.

DETAILED DESCRIPTION

The present application is further described with reference to the drawings and embodiments.

Figure 1:
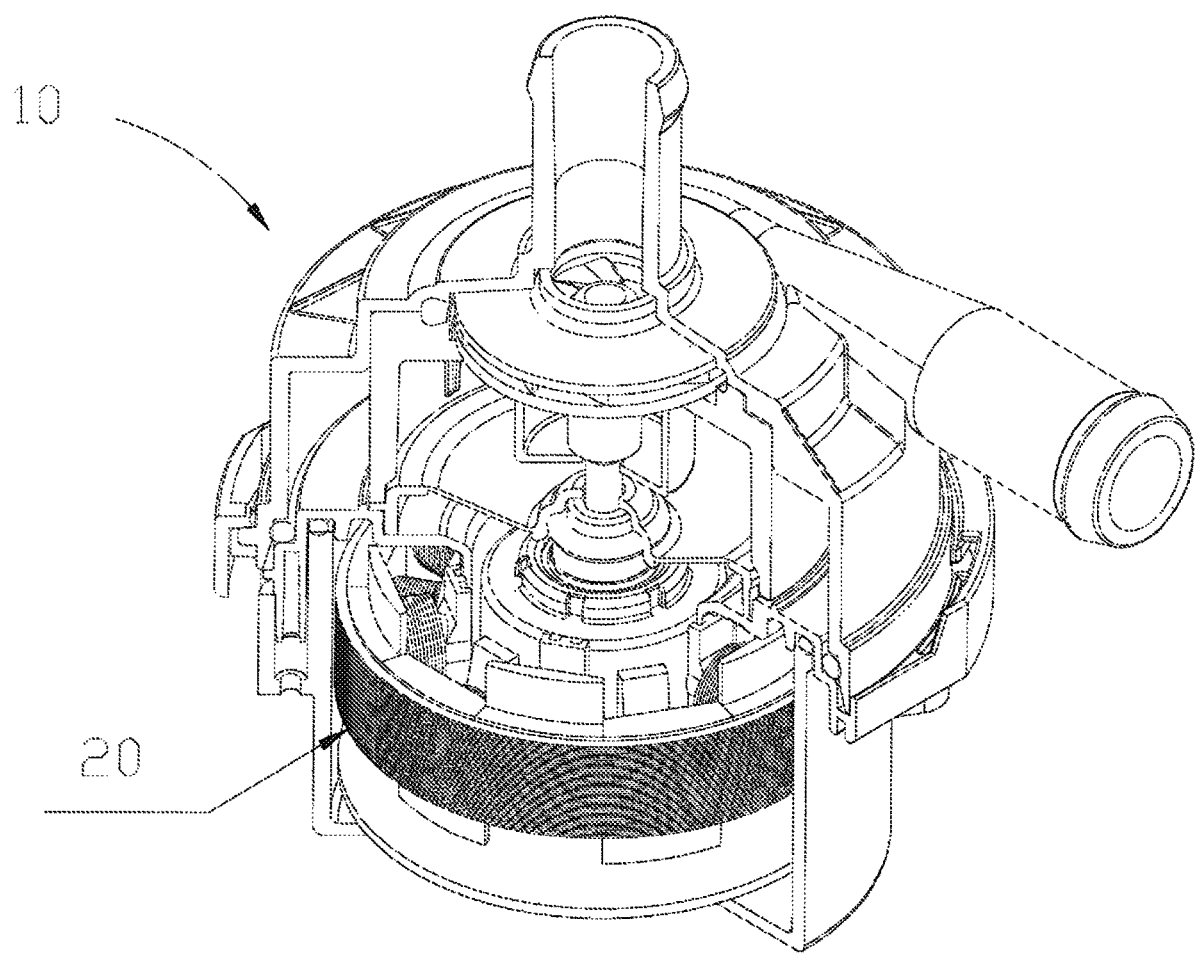
FIG. 1 is a schematic perspective view showing the structure of an electric pump according to the present application with a partially sectional view.
Figure 2:
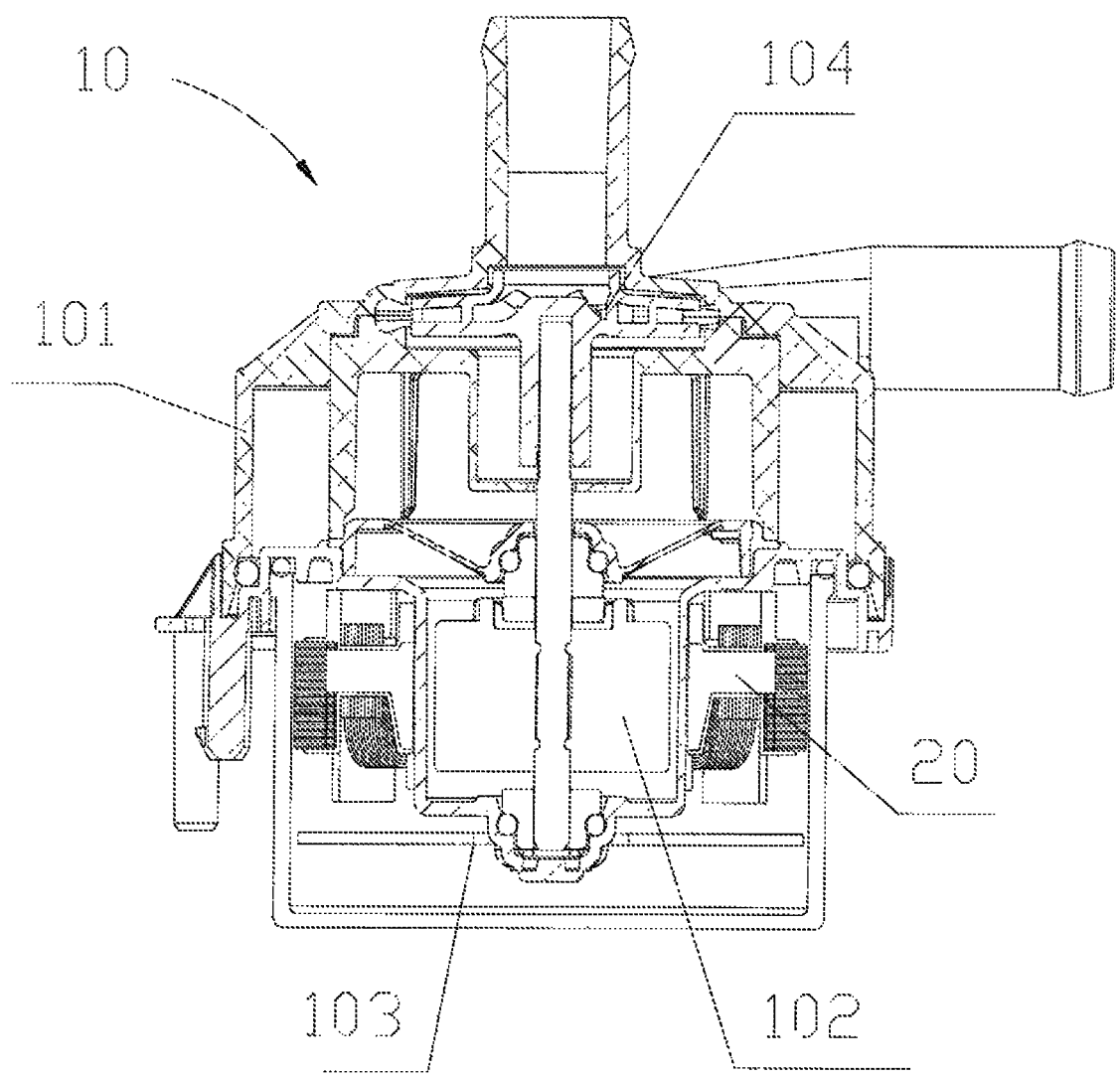
FIG. 2 is a schematic sectional view showing the structure of the electric pump in FIG. 1.
Figure 3:
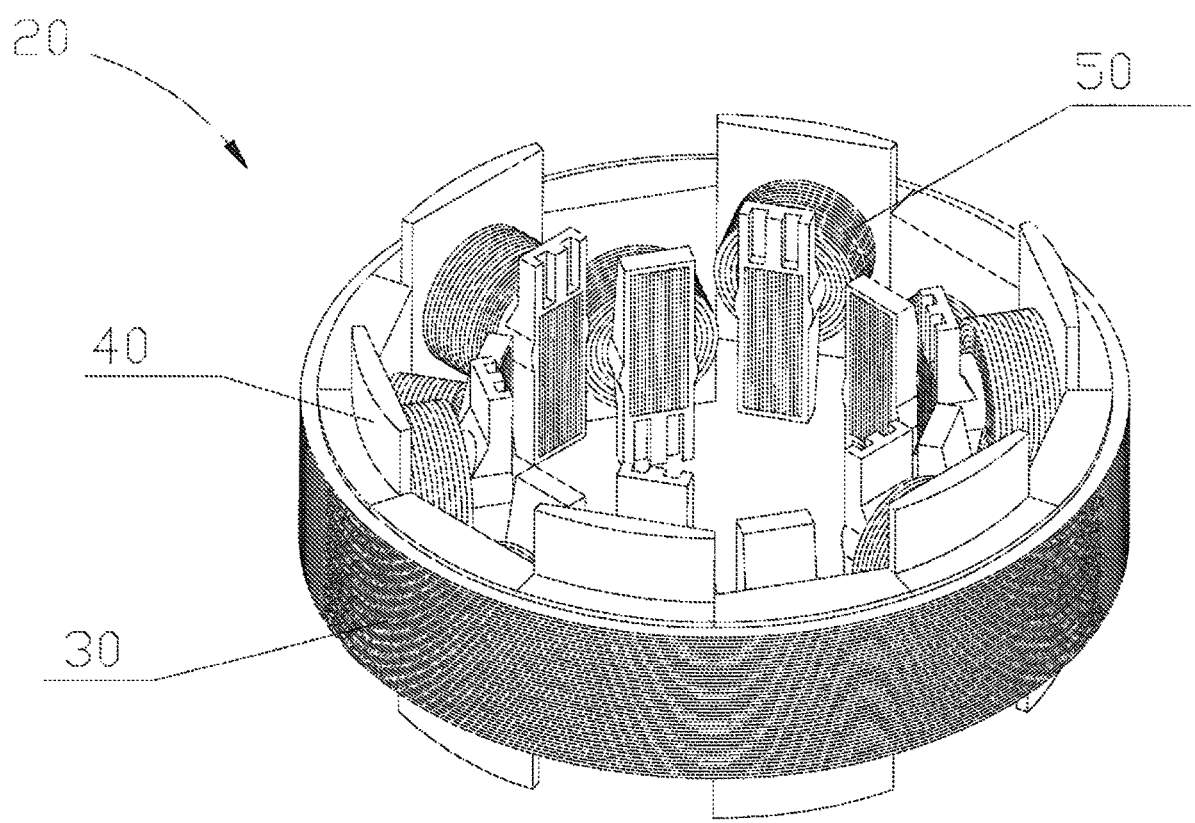
FIG. 3 is a schematic perspective view showing the structure of a stator assembly of the electric pump in FIG. 1.

Referring to FIGS. 1 to 3, an electric pump 10 includes a housing 101, a rotor assembly 102, a stator assembly 20, an electric control board 103 and an impeller 104. The housing 101 forms an inner cavity, and the rotor assembly 102, the stator assembly 20, the electric control board 103 and the impeller 104 are arranged in the inner cavity. The current flowing through the stator assembly 20 is controlled by the electric control board 103 so as to generate an excitation magnetic field. The rotor assembly 102 includes a permanent magnet, and the permanent magnet generates a magnetic field and is rotated in the excitation magnetic field. The permanent magnet is rotated so that the impeller 104 is rotated directly or indirectly. The impeller 104 is rotated, thus the fluid is stirred and the fluid is pumped out of the inner cavity and the pressure of the fluid is increased.

In this embodiment, the stator assembly 20 is arranged around the outer periphery of the rotor assembly 102, and the stator assembly 20 and the rotor assembly 102 are separated from each other by a partition, i.e., the rotor assembly 102 is arranged around the inner periphery of the partition, and the stator assembly 20 is arranged around the outer periphery of the partition. For ensuring a smooth rotation of the rotor assembly 102, an outer circumference of the rotor assembly 102 has a certain clearance from the inner periphery of the partition, and an inner circumference of the stator assembly 20 is arranged close to the outer periphery of the partition. For ensuring an electromagnetic force of the motor, the distance between the inner circumference of the stator assembly 20 and the outer circumference of the rotor assembly 102 is as small as possible.

In this embodiment, the stator assembly 20 includes a stator core 30, an insulation layer 40 and a winding 50. The insulation layer 40 is provided at least on part of an outer surface of the stator core 30, for insulating the stator core 30 from the winding 50, and ensuring the insulating performance of the winding 50. The stator core 30 is formed by stacking and riveting silicon steel sheets. Employing the common material and the conventional manufacturing process as such facilitates lowing costs. The stator core 30 includes a yoke 1 and multiple teeth 2, in this embodiment, each of the teeth 2 is arranged on an inner circumference of the yoke 1, and each of the teeth 2 includes necks 21, adjacent necks 21 are respectively close to opposite ends of the yokes 1, and alternate necks 21 are close to a same end of the yokes 1. The winding 50 is wound on an outer circumferential surface of the neck 21. Adjacent necks 21 being respectively close to the opposite ends of the yoke 1 may increase the distance between the adjacent necks 21, which facilitates winding of the winding; or, the stator assembly 20 may have a reduced outer diameter in the case that the distance between the necks 21 is constant, which may further allow the electric pump to have a reduced radial dimension in the case that the clearance for fitting is constant, thus the electric pump may have a reduced overall dimension. The neck 21 includes stacked silicon steel sheets (as shown in embodiments of FIGS. 4 to 18). The neck 21 includes a first end surface, a second end surface, a first stacking surface and a second stacking surface. The first end surface and the second end surface are arranged opposite to each other, and the first stacking surface and the second stacking surface are arranged opposite to each other. Each of the first stacking surface and the second stacking surface is in an arc shape. Since each of the first end surface and the second end surface has a relatively small area, the cross section of the neck is substantially in an elliptic shape. The neck having a arc surface has a smaller perimeter than a rectangular neck in the case that the cross sectional area is same, which facilitates reducing the length of the winding, saving materials, and meanwhile, the reducing of the length of the winding facilitates reducing copper consumption, which facilitates improving the efficiency of the motor, and further facilitates improving the efficiency of the electric pump.

Figure 4:
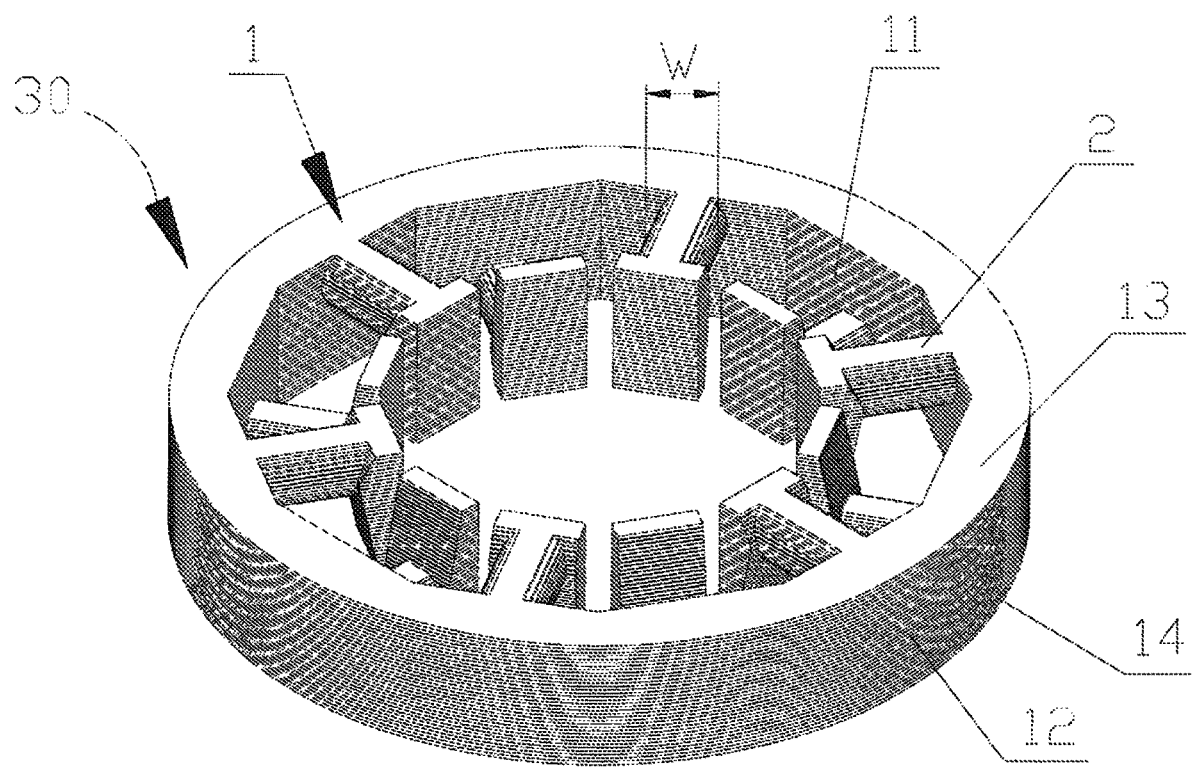
FIG. 4 is a schematic perspective view showing the structure of a first embodiment of a stator core of the stator assembly in FIG. 3.
Figure 5:
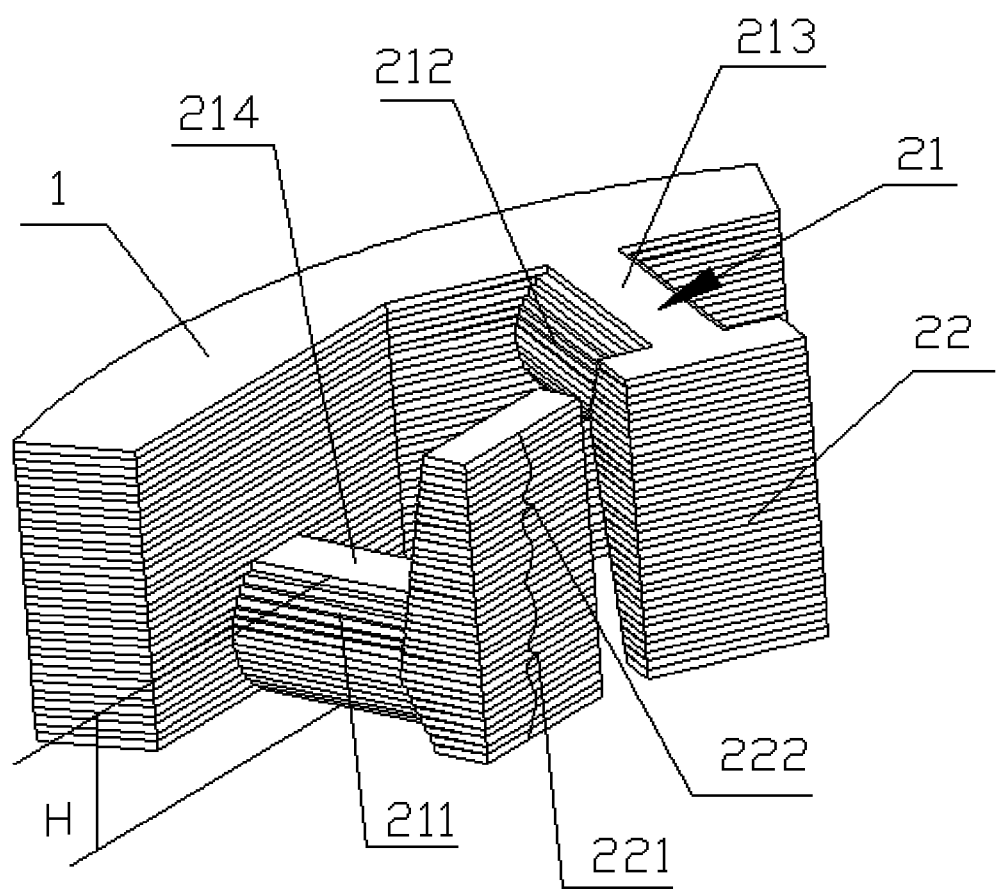
FIG. 5 is a schematic partial view showing the structure of the stator core in FIG. 4.

FIGS. 4 and 5 are schematic views showing the structure of a first embodiment of the stator core 30. Referring to FIGS. 4 and 5, the stator core 30 includes stacked silicon steel sheets, and the stator core 30 includes a yoke 1 and multiple teeth 2. In this embodiment, part of silicon steel sheets forming the yoke 1 and part of silicon steel sheets forming each of the teeth 2 are integrally formed, and the yoke 1 and each of the teeth 2 are connected integrally by the integrally formed silicon steel sheets. The teeth 2 are arranged and distributed along an inner circumferential surface of the yoke 1. Specifically, part of the silicon steel sheets of the yoke 1 and part of the silicon steel sheets of each of the teeth 2 are of an integral structure in the same layer, which improves the strength of connection between the yoke 1 and the teeth 2.

The yoke 1 includes an inner circumferential surface 11, an outer circumferential surface 12, a first end 13, and a second end 14. The inner circumferential surface 11 has a polygonal shaped projection and the outer circumferential surface 12 has a circular shaped projection in a stacking direction of the silicon steel sheets of the yoke 1. The first end 13 and the second end 14 are located at two ends of the yoke 1, the first end 13 and the second end 14 connect the inner circumferential surface 11 and the outer circumferential surface 12. The silicon steel sheet in each layer of the yoke 1 is of an integral closed structure, and for the silicon steel sheets of part of the silicon steel sheets of each of the teeth 2 located in same layers of the stator core, the part of the silicon steel sheets of each of the teeth 2 are formed by extending the silicon steel sheets of the yoke 1 towards an inside of the stator core.

Each of the teeth 2 includes a neck 21 and a tip 22. The neck 21 provides support for the winding, and the tip 22 is used for collecting magnetic field, and the tip 22 is connected to the yoke 1 by the neck 21. The neck 21 is connected to the yoke 1. The yoke 1 includes a connecting portion. The connecting portion is directly connected to the neck 21. The silicon steel sheets of the neck 21 and the silicon steel sheets of the connecting portion of the yoke 1 in the same layer are formed integrally. The tip 22 includes a first portion 221 and a second portion 222. The first portion 221 is in direct connection with the neck 21, the silicon steel sheets of the first portion 221 and the silicon steel sheets of the neck 21 in the same layer are formed integrally, and further the first portion 221 is in fixed connection with the neck 21. The silicon steel sheets of the second portion 222 are stacked on the first portion 221, and the second portion 222 is fixed to the first portion 221 by riveting.

The neck 21 includes a first stacking portion 211, a second stacking portion 212, a first plane portion 213 and a second plane portion 214. The first stacking portion 211 and the second stacking portion 212 are arranged opposite to each other, and the first plane portion 213 and the second plane portion 214 are arranged opposite to each other. The first plane portion 213 and the second plane portion 214 are located at two ends of the first stacking portion 211 and the second stacking portion 212. The first plane portion 213 and the second plane portion 214 include outer surfaces of the silicon steel sheets at two ends of the neck 21 in the stacking direction. The first stacking portion 211 and the second stacking portion 212 are formed into an arc-like shape by the lateral sides of the stacked silicon steel sheets.

For easy of describing, the stacking direction of the silicon steel sheets of the neck 21 is defined as a height direction of the neck 21, and a direction perpendicular to the stacking direction is defined as a width direction of the neck 21, i.e., the distance between the first plane portion 213 and the second plane portion 214 is a height H of the neck, and the width of the widest silicon steel sheet of the neck 21 is a width W of the neck 21. The widest silicon steel sheet of the neck 21 is one silicon steel sheet or successive multiple silicon steel sheets located in the middle of the neck 21 in the height direction. In the height direction of the neck 21, the widths of the silicon steel sheets of the neck 21 are in a trend of gradually increasing first and then gradually decreasing from the first plane portion 213 to the second plane portion 214.

The first stacking portion 211 and the second stacking portion 212 being in an arc-like shape include two cases. In one case, the width of the silicon steel sheets of the neck 21 gradually increase from the first plane portion 213 to the middle of the stacked silicon steel sheets in the height direction, and gradually decrease from the middle of the stacked silicon steel sheets to the second plane portion 214 in the height direction, thus, the cross section of the neck is an arc at the first stacking portion 211 or the second stacking portion 212. In another case, several silicon steel sheets having a same width are included in the middle of the stacked silicon steel sheets in the height direction, which allows the cross section of the neck to include two arc portions and a linear portion having a same width at parts corresponding to the first stacking portion 211 or the second stacking portion 212.

The distance from the top of the first stacking portion 211 to the top of the second stacking portion 212 is defined as a first distance W, and the distance between the first plane portion 213 and the second plane portion 214 is defined as a second distance H. The ratio of the second distance H to the first distance W is greater than or equal to ½ and smaller than or equal to 1. Thus, an arc portion is formed by stacked silicon steel sheets at the neck 21. When the required magnetic flux is unchanged, such neck 21 may have a reduced perimeter, and a reduced copper consumption, which facilitates improving the power of the motor applying the stator assembly.

In this embodiment, the second plane portion 214 of the neck 21 is arranged to be flush with a terminal end of the first portion 221 of the tip 22, and a second portion 222 of the tip 22 is arranged to protrude out of the first plane portion 213 of the neck 21. Such arrangement allows one end of the teeth 2 to be a flush reference, and in this way, the mold for molding the teeth 2 has a simple structure, which facilitates lowering the manufacturing cost.

The teeth 2 are fixed to the inner circumferential surface 11 of the yoke 1. In the stacking direction of the silicon steel sheets of the yoke 1, joints of adjacent teeth 2 and the yoke 1 are arranged to be staggered up and down, i.e., the neck 21 of one teeth 2 is arranged close to the first end 13 of the yoke 1, and the necks 21 of two adjacent teeth 2 of one tooth 2 are arranged close to the second end 14 of the yoke 1. The necks arranged to be staggered as such in the stacking direction of the silicon steel sheets of the yoke 1 may facilitate increasing the distance between centers of adjacent necks 21, and facilitate winding of the windings. The wound windings may overlap each other in a certain degree in the projection direction, which may lower the requirement for winding technique of the windings.

In this embodiment, the second plane portions 214 of the teeth 2 are arranged to be flush with the first end 13 of the yoke 1 or the second end 14 of the yoke 1, thus the molds for molding the yoke 1 and the teeth 2 have a common flush reference, which facilitate assembling.

Figure 6:
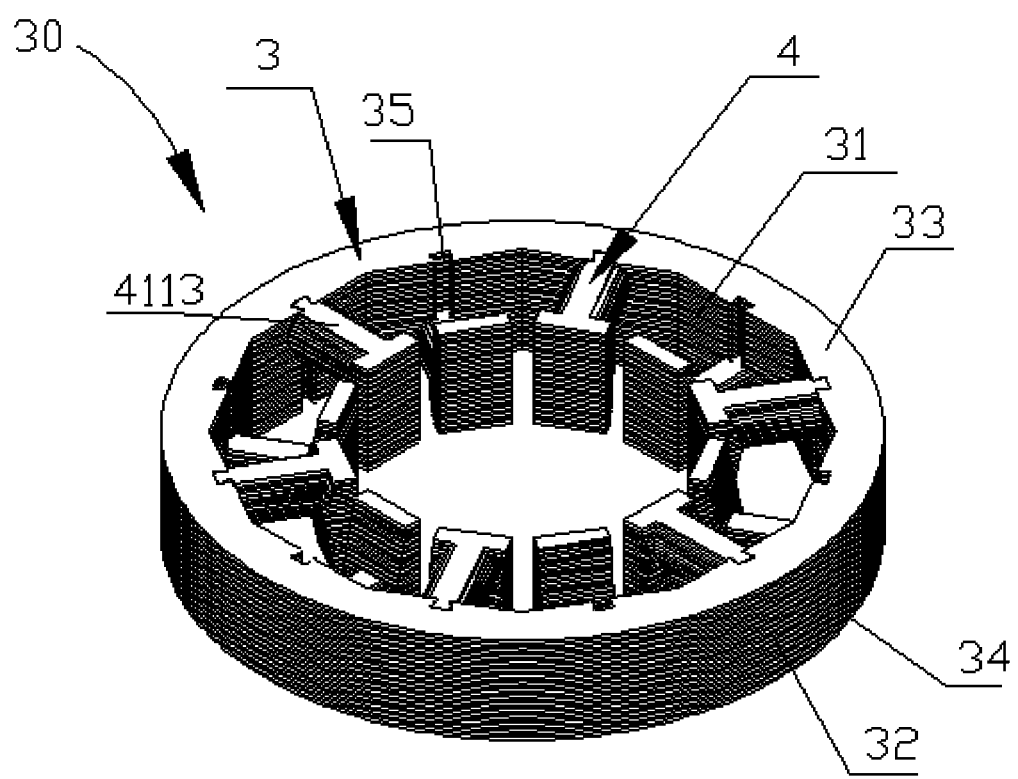
FIG. 6 is a schematic perspective view showing the structure of a second embodiment of the stator core of the stator assembly in FIG. 3.
Figure 7:
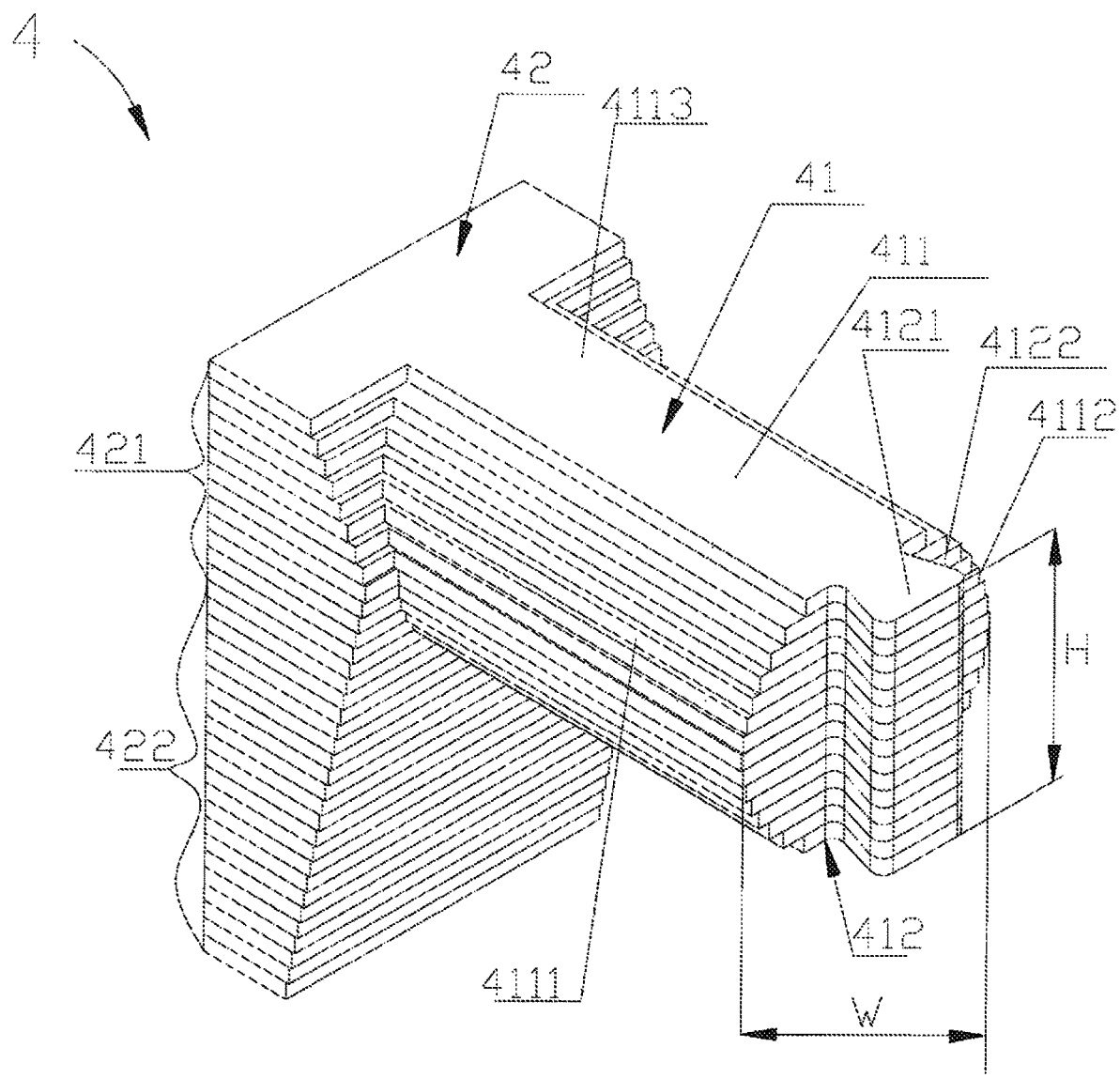
FIG. 7 is a schematic perspective view showing the structure of a tooth of the stator core in FIG. 4.

FIGS. 6 and 7 are schematic views showing the structure of a second embodiment of the stator core. Referring to FIGS. 6 and 7, the stator core 30 includes a yoke 3 and teeth 4, and the yoke 3 and the teeth 4 are formed respectively by stacking silicon steel sheets, i.e., the yoke 3 and the teeth 4 are formed separately, and the yoke 3 and the teeth 4 are fixed to each other via an insulation layer. Each of the parts respectively forming corresponding silicon steel sheets may facilitate improving the utilization rate of the silicon steel sheet material, and further facilitate lowering the cost of the silicon steel material. Further, the corresponding molds for respectively molding the yoke and the teeth may also be simplified, and the manufacturing cost may be lowered.

The yoke 3 includes an inner circumferential surface 31, an outer circumferential surface 32, a first end 33 and a second end 34. The inner circumferential surface 31 has a polygonal shaped projection and the outer circumferential surface 32 has a circular shaped projection in a stacking direction of the silicon steel sheets of the yoke 3. The first end 33 and the second end 34 are located at two ends of the yoke 3. The first end 33 and the second end 34 connect the inner circumferential surface 31 and the outer circumferential surface 32. The silicon steel sheet in each layer of the yoke 3 is of an integral closed structure, and the stacked silicon steel sheets are fixed by riveting.

An inner circumferential surface 31 of the yoke 3 is provided with mounting grooves 35, and the mounting grooves 35 are distributed uniformly on the inner circumferential surface 31. Each of the mounting grooves 35 is formed from the inner circumferential surface 31 to a body of the yoke 3 and extends through the first end 35 and the second end 34, which allows each of the teeth 4 to be mounted from one of the two ends of the yoke 3, and the assembly to be convenient.

Referring to FIGS. 6 and 7, each of the teeth 4 includes a neck 41 and a tip 42, and a stacking direction of the silicon steel sheets of the neck 41 is the same with a stacking direction of the silicon steel sheets of the tip 42, and part of the stacked silicon steel sheets of the neck 41 and part of the stacked silicon steel sheets of the tip 42 are of an integral structure, which allows the connection between the neck 41 and the tip 42 to be more reliable.

The neck 41 includes a winding portion 411 and a mounting portion 412, and the winding portion 411 provides support for the winding, and the mounting portion 412 is used for limiting the position of each of the teeth 4 and the yoke 3. The winding portion 411 includes a first stacking portion 4111, a second stacking portion 4112, a first plane portion 4113 and a second plane portion 4114. The first stacking portion 4111 and the second stacking portion 4112 are formed by lateral sides of the stacked silicon steel sheets forming the winding portion 411, and the first stacking portion 4111 and the second stacking portion 4112 are in an arc-like shape in the cross section of the winding portion. The first plane portion 4113 and the second plane portion 4114 are formed by outer surfaces of the silicon steel sheets at two ends of the stacked silicon steel sheets forming the winding portion 411. The first stacking portion 4111 and the second stacking portion 4112 are arranged opposite to each other, and the first plane portion 4113 and the second plane portion 4114 are arranged opposite to each other.

For easy of describing, the stacking direction of the silicon steel sheets of the winding portion 411 is defined as a height direction of the winding portion 411, and a direction perpendicular to the stacking direction is defined as a width direction of the winding portion 411. In the height direction of the winding portion 411, the widths of the silicon steel sheets of the winding portion 411 are in a trend of gradually increasing first and then gradually decreasing from the first plane portion 4113 to the second plane portion 4114.

The first stacking portion 4111 and the second stacking portion 4112 being in an arc-like shape include two cases. In one case, the widths of the silicon steel sheets of the winding portion 411 gradually increase from the first plane portion 4113 to the middle of the stacked silicon steel sheets in the height direction, and gradually decrease from the middle of the stacked silicon steel sheets in the height direction to the second plane portion 4114, thus, the cross section of the winding portion is an arc at the first stacking portion 4111 or the second stacking portion 4112. In another case, several silicon steel sheets having the same width are included in the middle of the stacked silicon steel sheets in the height direction, which allows the cross section of the winding portion to include two arc portions and a linear portion formed by silicon steel sheets having a same width at the first stacking portion 4111 or the second stacking portion 4112.

The distance between the first stacking portion 4111 and the second stacking portion 4112 is a first distance W, and the distance between the first plane portion 4113 and the second plane portion 4114 is a second distance H. The ratio of the second distance H to the first distance W is greater than or equal to ½ and smaller than or equal to 1, thus, the winding portion 411 is formed to have an arc shape at the first stacking portion and the second stacking portion by the stacked silicon steel sheets. When the required magnetic flux is unchanged, the winding portion 411 may have a reduced perimeter, and a reduced copper consumption, which may facilitate improving the power of the motor applying the stator assembly.

The tip 42 includes a first portion 421 and a second portion 422. The first portion 421 is directly connected to the neck 41. A silicon steel sheet in the stacked silicon steel sheets of the first portion 421 and a silicon steel sheet in the stacked silicon steel sheets of the neck 41 are formed integrally, and the second portion 422 is stacked to the first portion 421 and is fixed to the first portion 421 by riveting.

The mounting portion 412 includes a protrusion 4121 and a stepped portion 4122. In an extending direction of the winding portion 411, the mounting portion 412 is arranged at one end of the winding portion 411 and the tip 42 is arranged at another end of the winding portion 411. The protrusion 4121 is inserted into the mounting groove 35 of the yoke 3, and the stepped portion 4122 is in contact with the inner circumferential surface to limit the depth of the protrusion 4121 being inserted into the mounting groove 35. The protrusion 4121 and the stepped portion 4122 are formed by the stacked silicon steel sheets protruding partially in the length direction of the silicon steel sheets.

In this embodiment, the first plane portion 4113 of the neck 41 is arranged to be flush with the first portion 421 of the tip 42, and the second portion 422 of the tip 42 is arranged to protrude out of the second plane portion 4114 of the neck 421. Such arrangement allows each of the teeth 4 to form a flush reference at the first plane portion 4113, and in this way, the mold for forming each of the teeth 4 has a simple structure, which facilitates lowering the manufacturing cost.

Each of the teeth 4 and the yoke 3 has positions limited by the protrusion 4121 and the mounting groove 35, and are fixed by the insulation layer. In the stacking direction of the silicon steel sheets of the yoke 3, joints of adjacent teeth 4 and the yoke 3 are arranged to be staggered up and down, i.e., the neck 41 of one tooth 4 is arranged close to the first end 33 of the yoke 3, and the necks 41 of two adjacent teeth 4 of the one tooth 4 are arranged close to the second end 34 of the yoke 3. The necks arranged to be staggered as such may facilitate increasing the distance between centers of adjacent necks 41, and facilitate winding of the windings. The wound windings may overlap each other in a certain degree in the projection direction, which may lower the requirement for winding technique of the windings.

After each of the teeth 4 is fixed to the yoke 3, the stacking direction of the silicon steel sheets of each of the teeth 4 is the same as the stacking direction of the silicon steel sheets of the yoke 3. For a stator core with a small stacking height, this structure is simple, the utilization rate of the material is high, and the manufacturability is also good.

Figure 8:
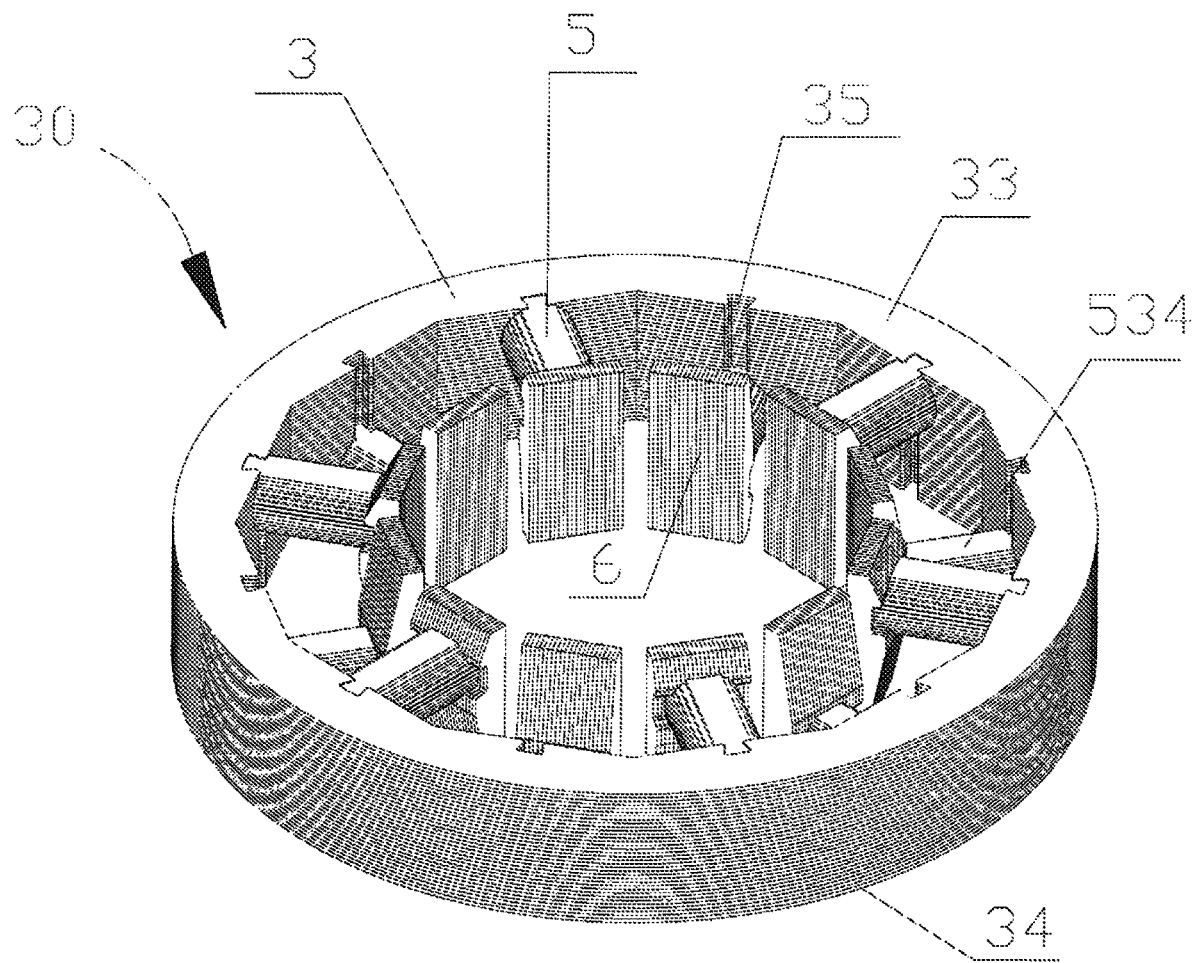
FIG. 8 is a schematic perspective view showing the structure of a third embodiment of the stator core of the stator assembly in FIG. 3.
Figure 9:
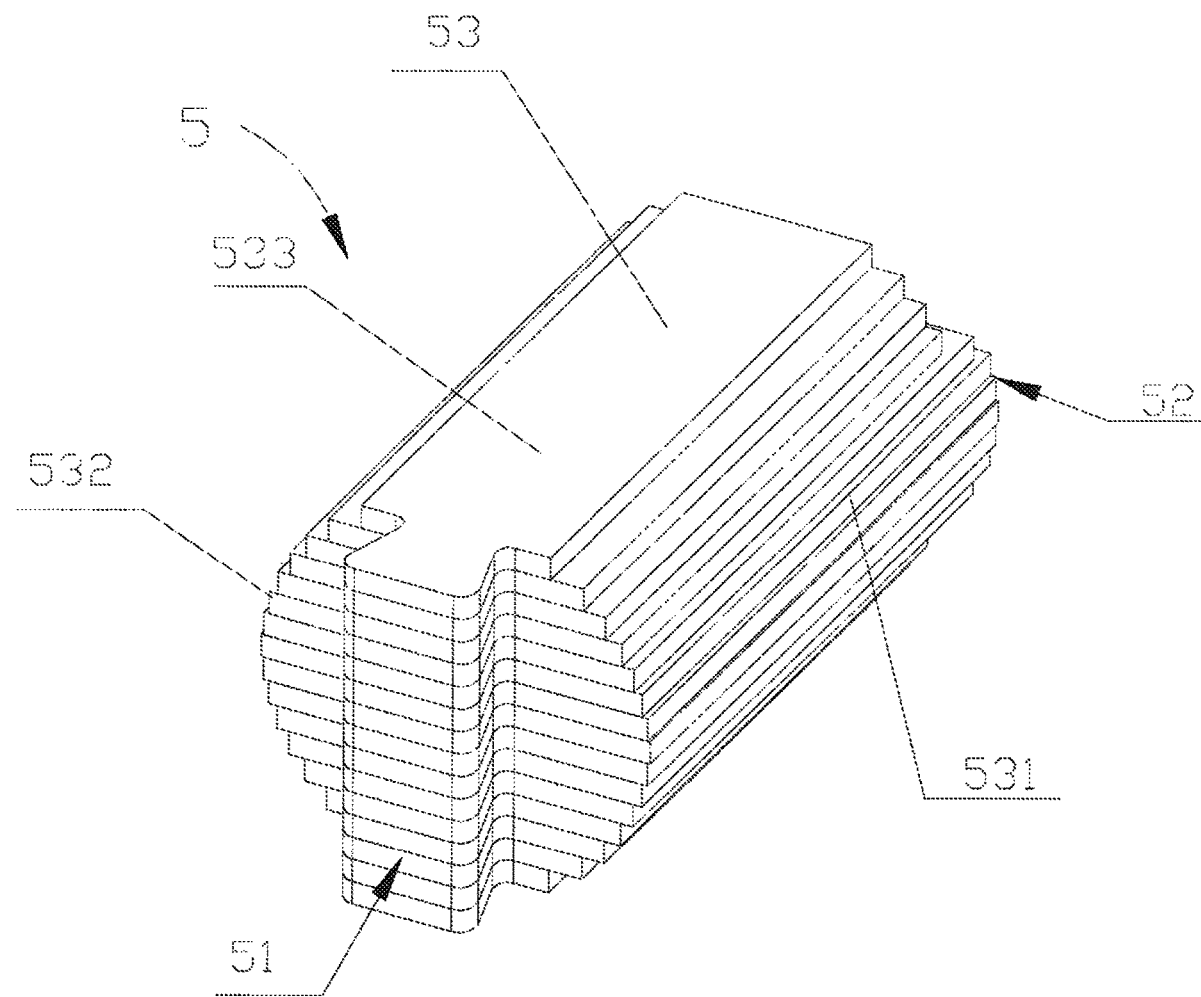
FIG. 9 is a schematic perspective view showing the structure of a neck of the stator core in FIG. 8.
Figure 10:
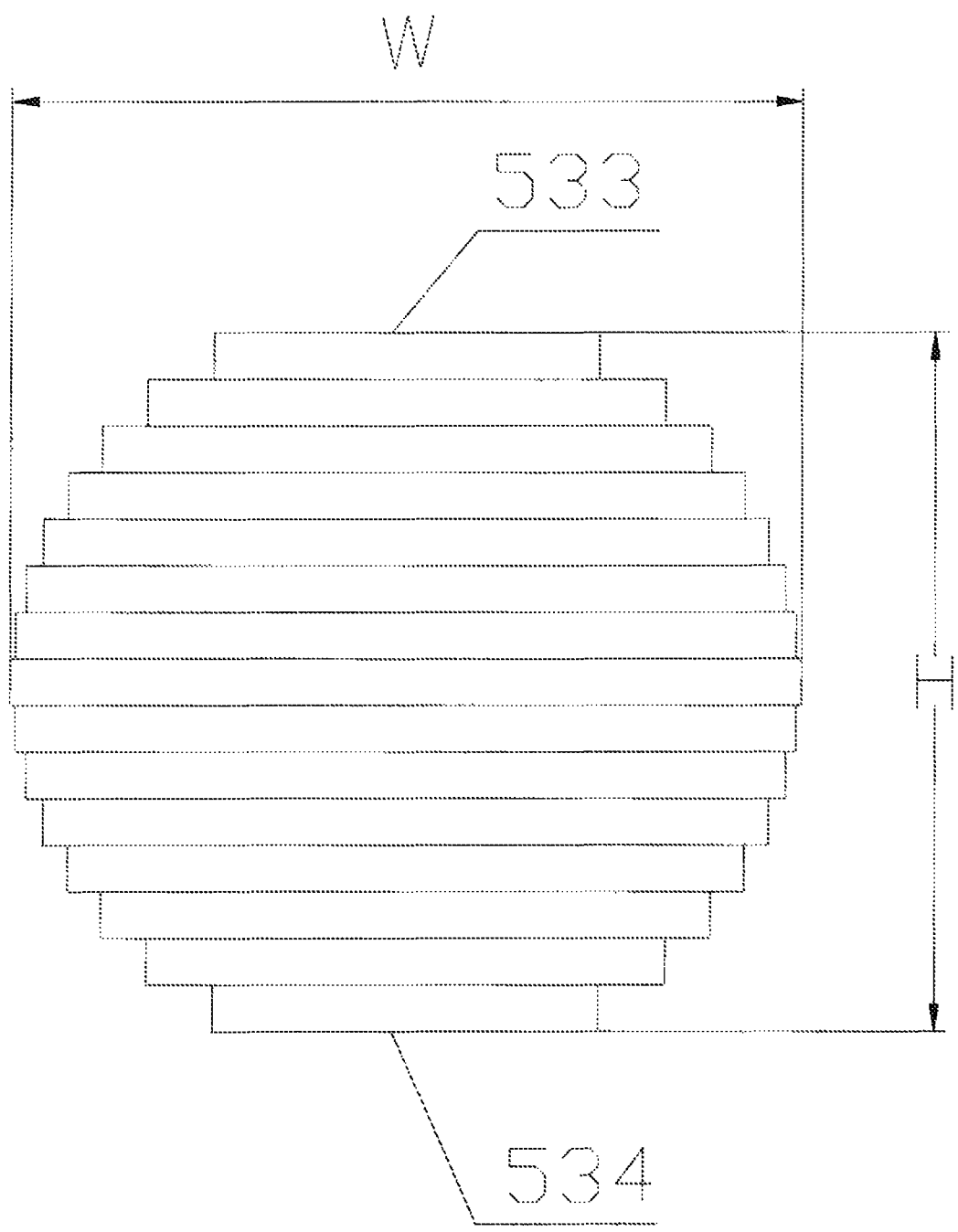
FIG. 10 is a schematic right view showing the structure of the neck in FIG. 9.
Figure 11:
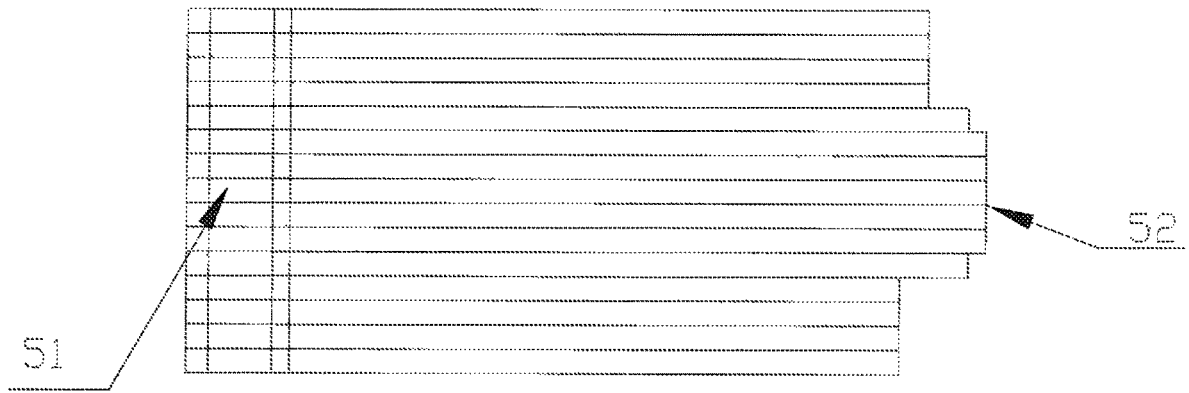
FIG. 11 is a schematic front view showing the structure of the neck in FIG. 9.
Figure 12:
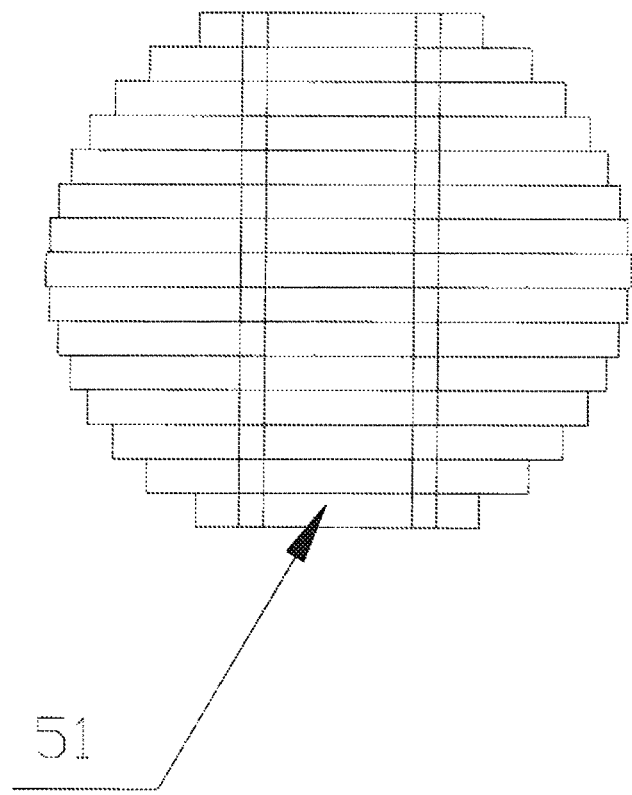
FIG. 12 is a schematic left view showing the structure of the neck in FIG. 9.
Figure 13:
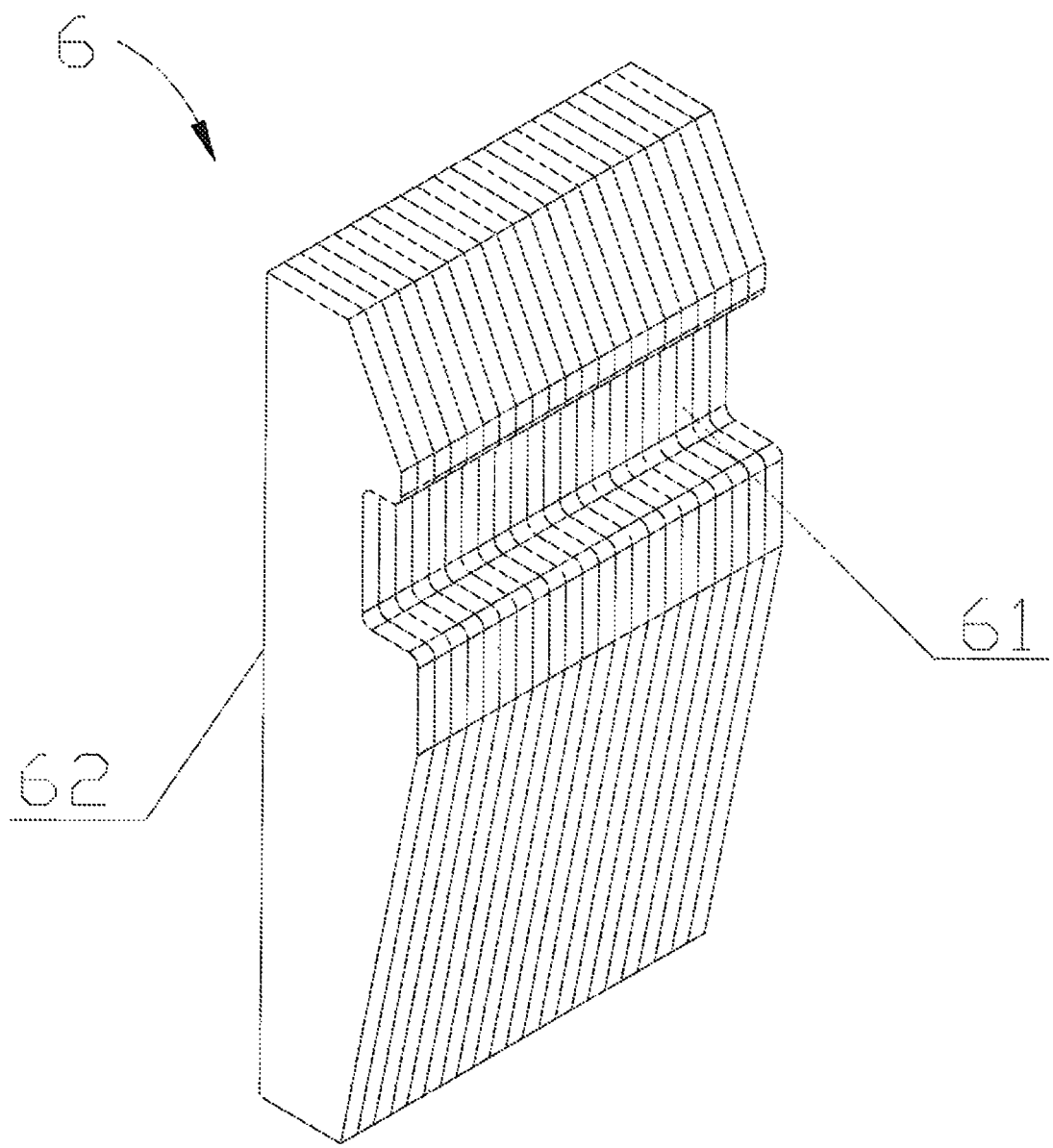
FIG. 13 is a schematic perspective view showing the structure of a tip of the stator core in FIG. 8.
Figure 14:
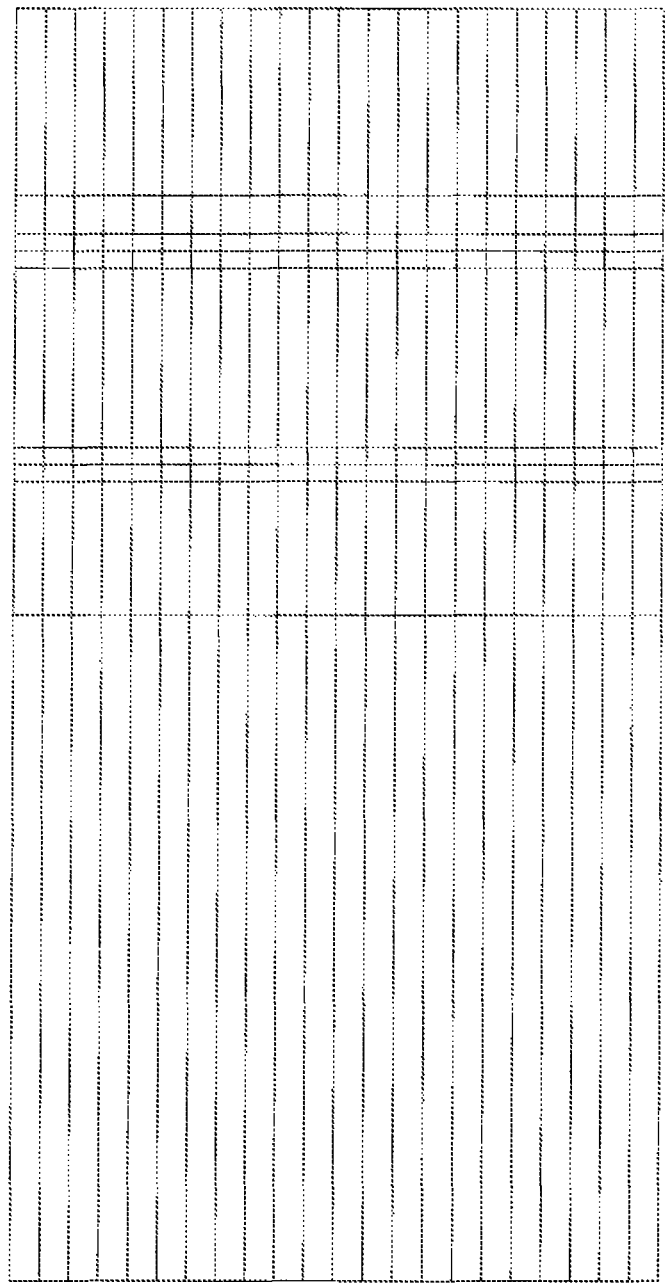
FIG. 14 is a schematic front view showing the structure of the tip in FIG. 13.
Figure 15:
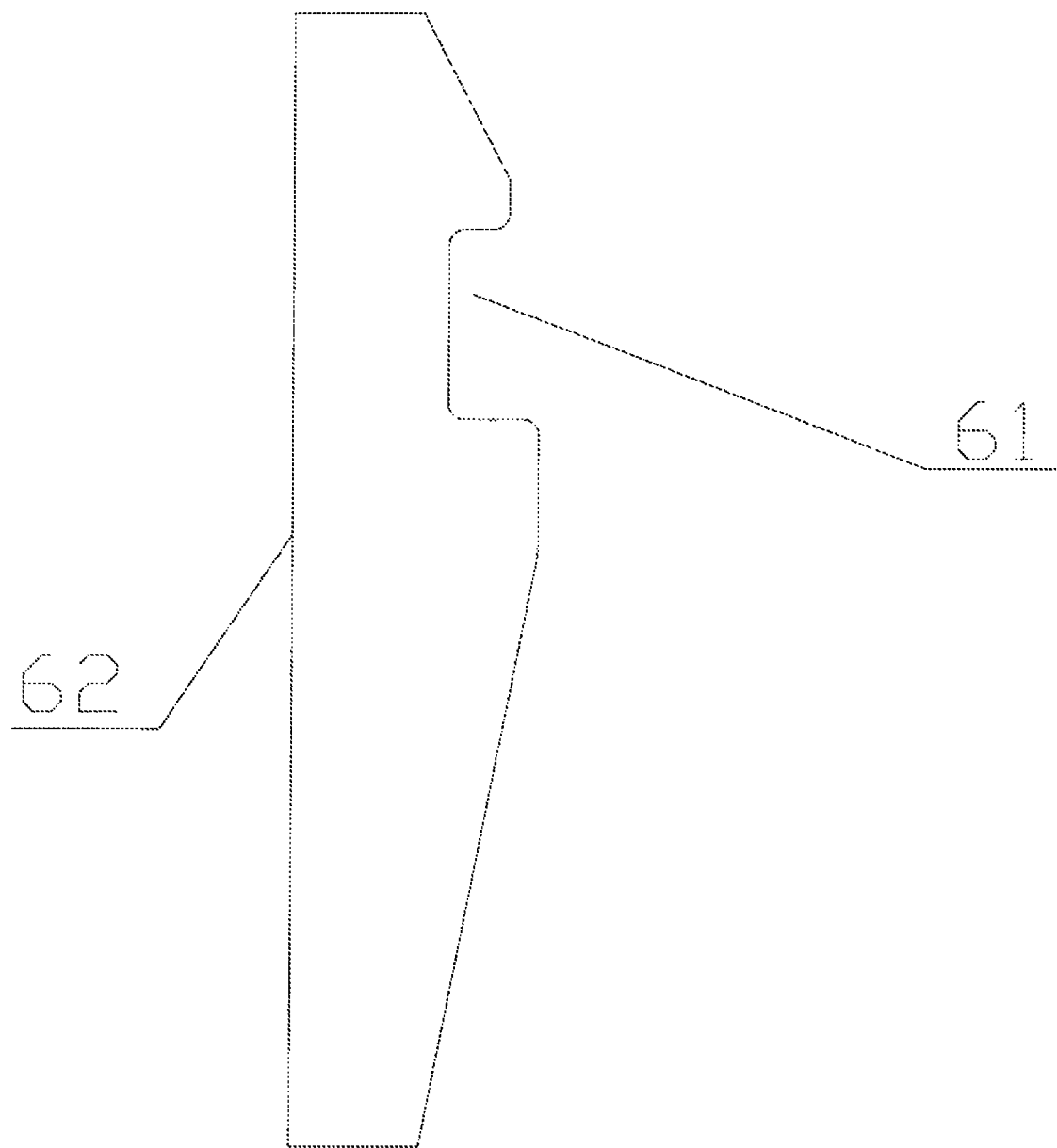
FIG. 15 is a schematic left view showing the structure of the tip in FIG. 13.

FIGS. 8 to 15 are schematic views showing the overall or partial structure of the third embodiment of the stator core. Referring to FIG. 8, the stator core 30 includes a yoke 3, a neck 5 and a tip 6. The neck 5 provides support for the winding, and the tip 6 is used for collecting magnetic field. The yoke 3 limits positions of multiple necks 5. The yoke 3, the neck 5 and the tip 6 are respectively formed by stacking and riveting their respective silicon steel sheets. The yoke 3, the neck 5 and the tip 6 are integrally fixed by injection molding via the insulation layer after having their positions limited. Each of teeth in this embodiment includes a neck 5 and a tip 6.

In this embodiment, the yoke 3 is the same as the yoke 3 in the second embodiment. The yoke 3 includes first mounting grooves 35. The neck 5 includes a first mounting portion 51, a second mounting portion 52 and a winding portion 53. The first mounting portion 51 and the second mounting portion 52 are respectively arranged at two ends of the winding portion 53. The first mounting portion 51 extends in the stacking direction of the silicon steel sheets of the neck 5, and the second mounting portion 52 is located at a terminal end of the neck 5 and extends in a direction perpendicular to the stacking direction of the silicon steel sheets of the neck 5. The first mounting portion 51 includes a protrusion 511 and a stepped portion 512. The protrusion 511 is inserted into the first mounting groove 35 and the stepped portion 512 is arranged to be in contact with the inner circumferential surface of the yoke 3, which limits the inserting depth of the protrusion 511.

The winding portion 53 includes a first stacking portion 531, a second stacking portion 532, a first plane portion 533 and a second plane portion 534. The first stacking portion 531 and the second stacking portion 532 are formed into an arc-like shape by lateral sides of the stacked silicon steel sheets forming the winding portion 53. The first plane portion 533 and the second plane portion 534 are formed by outer surfaces of the silicon steel sheets at two ends of the stacked silicon steel sheets forming the winding portion 53. The first stacking portion 531 and the second stacking portion 532 are arranged opposite to each other, and the first plane portion 533 and the second plane portion 534 are arranged opposite to each other.

For easy of describing, the stacking direction of the silicon steel sheets of the winding portion 53 is defined as a height direction of the winding portion 53. A direction perpendicular to the stacking direction is defined as a width direction of the winding portion 53. In the height direction of the winding portion 53, the widths of the silicon steel sheets of the winding portion 53 are in a trend of gradually increasing first and then gradually decreasing from the first plane portion 533 to the second plane portion 534.

The first stacking portion 531 and the second stacking portion 532 being in an arc-like shape include two cases. In one case, the widths of the silicon steel sheets of the winding portion 53 gradually increase from the first plane portion 533 to the middle of the stacked silicon steel sheets in the height direction, and gradually decrease from the middle of the stacked silicon steel sheets in the height direction to the second plane portion 534, thus, the first stacking portion 531 or the second stacking portion 532 is of an arc. In another case, several silicon steel sheets having the same width are included in the middle of the stacked silicon steel sheets in the height direction, which allows the first stacking portion 531 or the second stacking portion 532 to include two arc portions and a linear portion formed by silicon steel sheets having a same width.

The distance from the first stacking portion 531 to the second stacking portion 532 is a first distance W, and the distance between the first plane portion 533 and the second plane portion 534 is a second distance H. The ratio of the second distance H to the first distance W is greater than or equal to ½ and smaller than or equal to 1, thus, the winding portion 53 is formed to have an arc portion by lateral sides of stacked silicon steel sheets. When the required magnetic flux is unchanged, the winding portion may have a reduced perimeter, and a reduced copper consumption, which may facilitate improving the power of the motor applying the stator assembly.

The tip 6 includes a second mounting groove 61 and a magnet collecting surface 62. The second mounting groove 61 is arranged at a side opposite to the magnet collecting surface 62, and the second mounting groove 61 is arranged close to a terminal end and away from another terminal end. An extending direction of the second mounting groove 61 is the same with the stacking direction of the silicon steel sheets of the tip 6.

To assemble the yoke 3, the neck 5 and the tip 6, the neck 5 is inserted into the first mounting groove 35 of the yoke 3 by the first mounting portion 51, and the neck 5 is inserted into the second mounting groove 61 by the second mounting portion 52. In an assembled state, the yoke 3 and the neck 5 have the same stacking direction, and the stacking direction of the tip 6 is perpendicular to the stacking direction of the neck, and in this way, the forces subjected by the neck 5 and the tip 6 are even, which facilitates improving connection strength.

After the yoke 3 and the neck 5 are fixed by injection molding via the insulation layer, in the stacking direction of the silicon steel sheets of the yoke 3, joints of adjacent necks 5 and the yoke 3 are arranged to be staggered up and down, i.e., one neck 5 is arranged close to the first end 33 of the yoke 3, and two adjacent necks 5 of the one neck 5 are arranged close to the second end 34 of the yoke 3. The necks 5 arranged to be staggered as such may facilitate increasing the distance between centers of adjacent necks 5, and facilitate winding of the windings. The wound windings may overlap each other in a certain degree in the projection direction, which may lower the requirement for winding technique of the windings.

Figure 16:
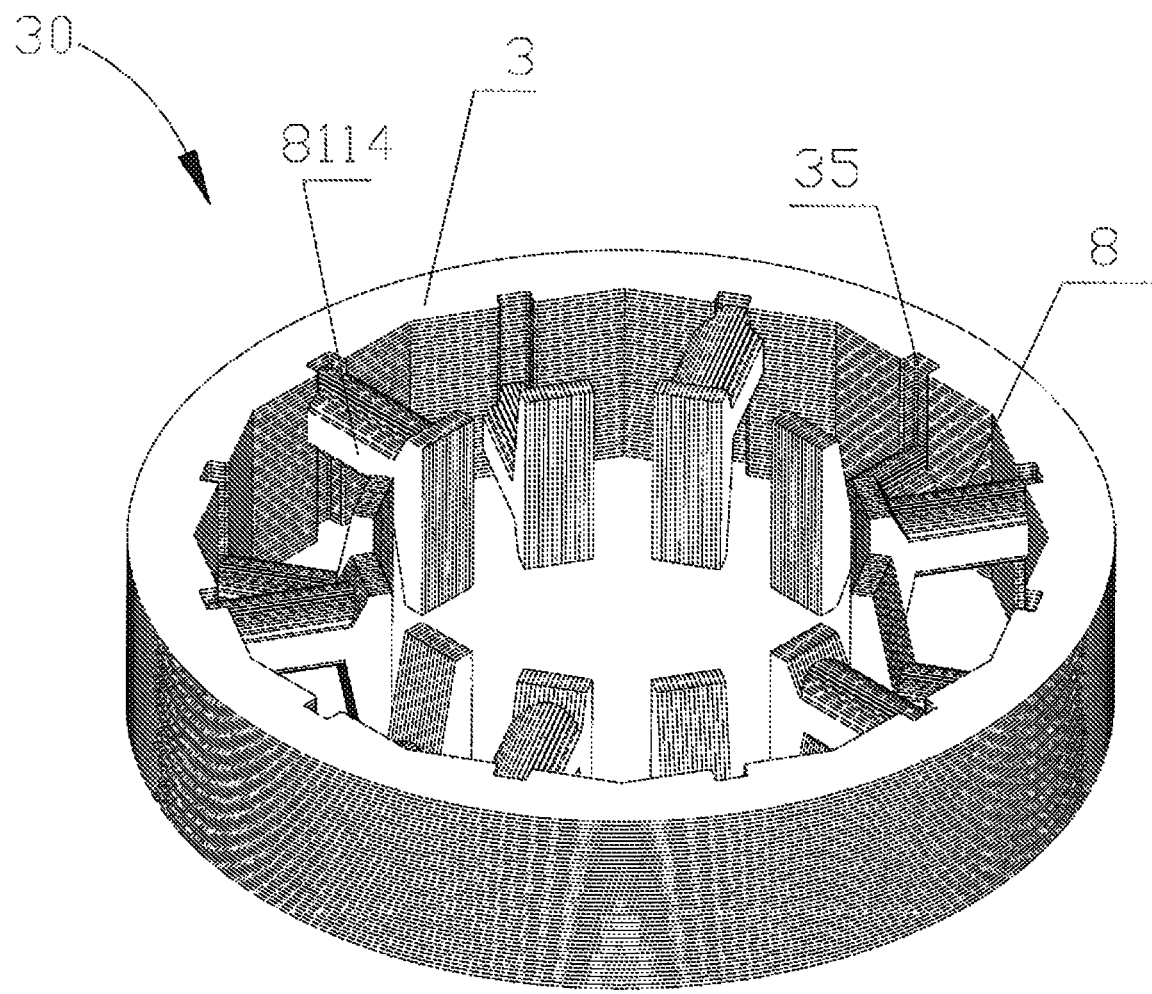
FIG. 16 is a schematic perspective view showing the structure of a fourth embodiment of the stator core of the stator assembly in FIG. 3.
Figure 17:
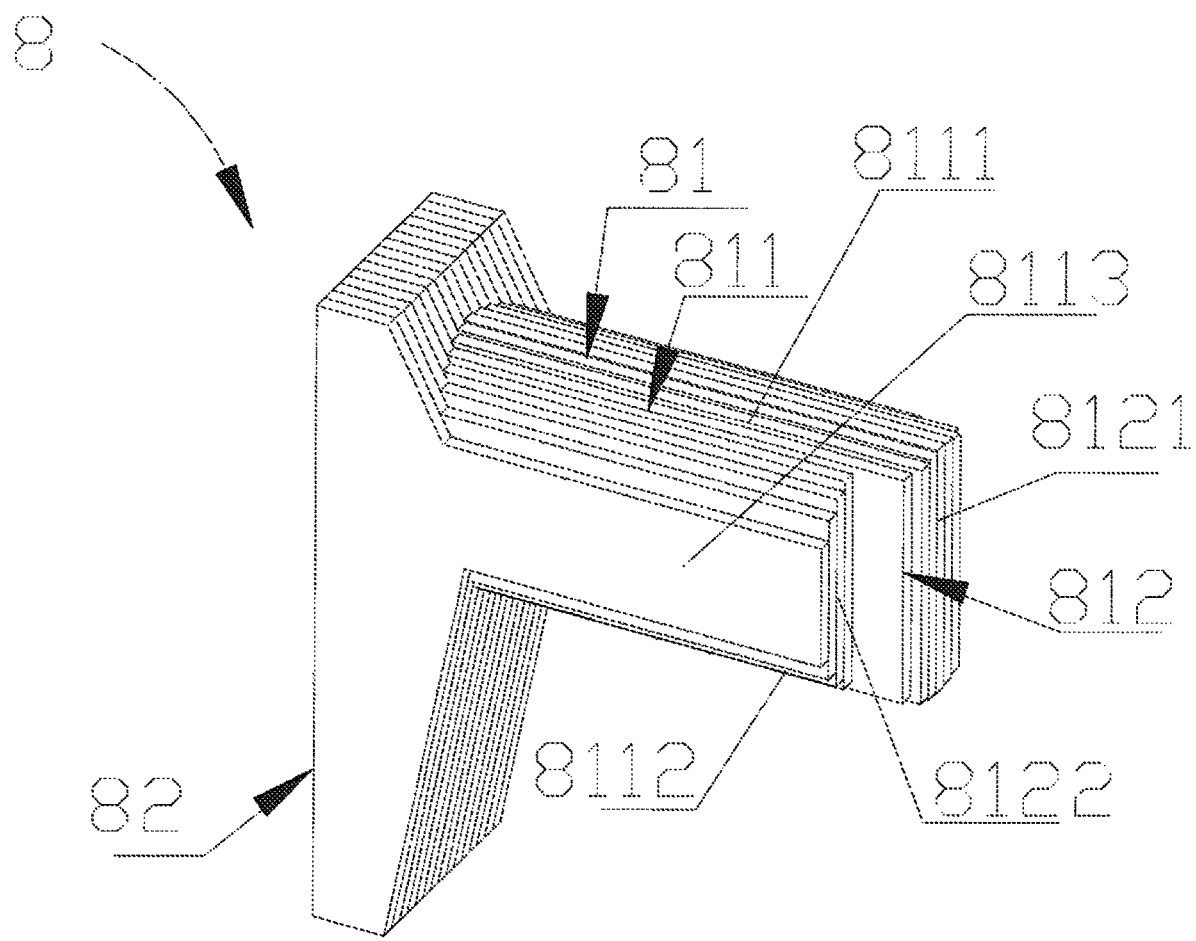
FIG. 17 is a schematic perspective view showing the structure of a tooth of the stator core in FIG. 16.
Figure 18:
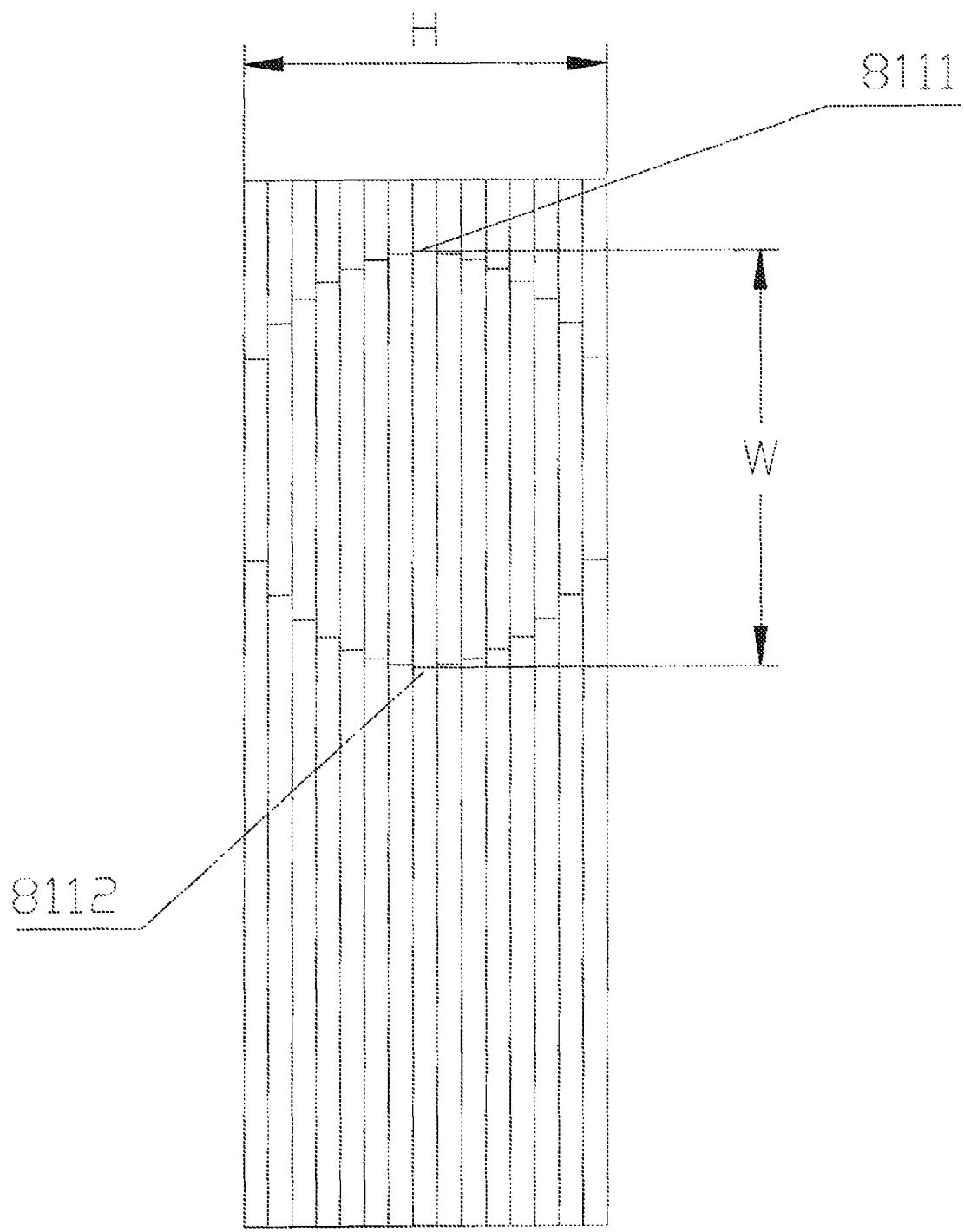
FIG. 18 is a schematic front view showing the structure of the tooth in FIG. 17.

FIGS. 16 to 22 are schematic views showing the overall or partial structure of the fourth embodiment of the stator core. Referring to FIGS. 16 to 18, the stator core 30 includes a yoke 3 and teeth 8. The yoke 3 and the teeth 8 are respectively formed by stacking and riveting their respective silicon steel sheets. The yoke 3 according to this embodiment has a same structure with the yoke 3 according to the second embodiment and the third embodiment, and the yoke 3 and the teeth 8 are fixed by injection molding via the insulation layer.

Each of the teeth 8 includes a neck 81 and a tip 82. A silicon steel sheet of the neck 81 and a silicon steel sheet of the tip 82 in the same layer are an integral structure, which may increase the strength of the connection between the neck 81 and the tip 82. The neck 81 includes a winding portion 811 and a mounting portion 812. The winding portion 811 provides support to the winding, and the neck 81 is connected to the yoke 3 by the mounting portion 812.

The winding portion 811 includes a first stacking portion 8111, a second stacking portion 8112, a first plane portion 8113 and a second plane portion 8114. The first stacking portion 8111 and the second stacking portion 8112 are formed into an arc-like shape by lateral sides of the stacked silicon steel sheets forming the winding portion 811. The first plane portion 8113 and the second plane portion 8114 are formed by outer surfaces of the silicon steel sheets at two ends of the stacked silicon steel sheets forming the winding portion 811. The first stacking portion 8111 and the second stacking portion 8112 are arranged opposite to each other, and the first plane portion 8113 and the second plane portion 8114 are arranged opposite to each other.

For easy of describing, the stacking direction of the silicon steel sheets of the winding portion 811 is defined as a height direction of the winding portion 811, and a direction perpendicular to the stacking direction is a width direction of the winding portion 811. In the height direction of the winding portion 811, the widths of the silicon steel sheets of the winding portion 811 are in a trend of gradually increasing first and then gradually decreasing from the first plane portion 8113 to the second plane portion 8114.

The first stacking portion 8111 and the second stacking portion 8112 being in an arc-like shape include two cases. In one case, the widths of the silicon steel sheets of the winding portion 811 gradually increase from the first plane portion 8113 to the middle of the stacked silicon steel sheets in the height direction, and gradually decrease from the middle of the stacked silicon steel sheets in the height direction to the second plane portion 8114, thus, the first stacking portion 8111 or the second stacking portion 8112 is of an arc. In another case, several silicon steel sheets having the same width are included in the middle of the stacked silicon steel sheets in the height direction, which allows the first stacking portion 8111 or the second stacking portion 8112 to include two arc portions and a linear portion.

The distance from the top of the first stacking portion 8111 to the top of the second stacking portion 8112 is a first distance W. The ratio of a second distance H between the first plane portion 8113 and the second plane portion 8114 to the first distance W is greater than or equal to ½ and smaller than or equal to 1, thus, the winding portion 811 is formed to have an arc portion by the stacked silicon steel sheets. When the required magnetic flux is unchanged, the winding portion 811 may have a reduced perimeter, and a reduced copper consumption, which may facilitate improving the power of the motor applying the stator assembly.

The winding portion 811 is arranged to be eccentric from the tip 82, and one end of the winding portion 811 is connected to the tip 82 and another end of the winding portion 811 is connected to the mounting portion 812. The mounting portion 812 includes a protrusion 8121 and a stepped portion 8122. The protrusion 8121 is inserted into the mounting groove 35 of the yoke 3. The stepped portion 8122 is in contact with the inner circumferential surface of the yoke 3 for limiting the depth of the protrusion 8121 being inserted into the mounting groove 35. The protrusion 8121 and the stepped portion 8122 are formed by the stacked silicon steel sheets protruding partially in the length direction of the silicon steel sheets.

Each of the teeth 8 and the yoke 3 has their positions limited by the protrusion 8121 and the mounting groove 35, and are fixed via the insulation layer. In the stacking direction of the silicon steel sheets of the yoke 3, joints of adjacent teeth 8 and the yoke 3 are arranged to be staggered up and down, i.e., the neck 81 of one tooth 8 is arranged close to the first end of the yoke 3, and the necks 81 of two adjacent teeth 8 of the one tooth 8 are arranged close to the second end of the yoke. The necks 81 arranged to be staggered as such may facilitate increasing the distance between centers of adjacent necks 81, and facilitate winding of the windings. The wound windings may overlap each other in a certain degree in the projection direction, which may lower the requirement for winding technique of the windings.

In this embodiment, after the teeth 8 are fixed to the yoke 3, the stacking direction of the silicon steel sheets of the yoke 3 is perpendicular to the stacking direction of the silicon steel sheets of the teeth 8. The stator core according to this embodiment is fit for the yoke having a large stacking height.

Figure 19:
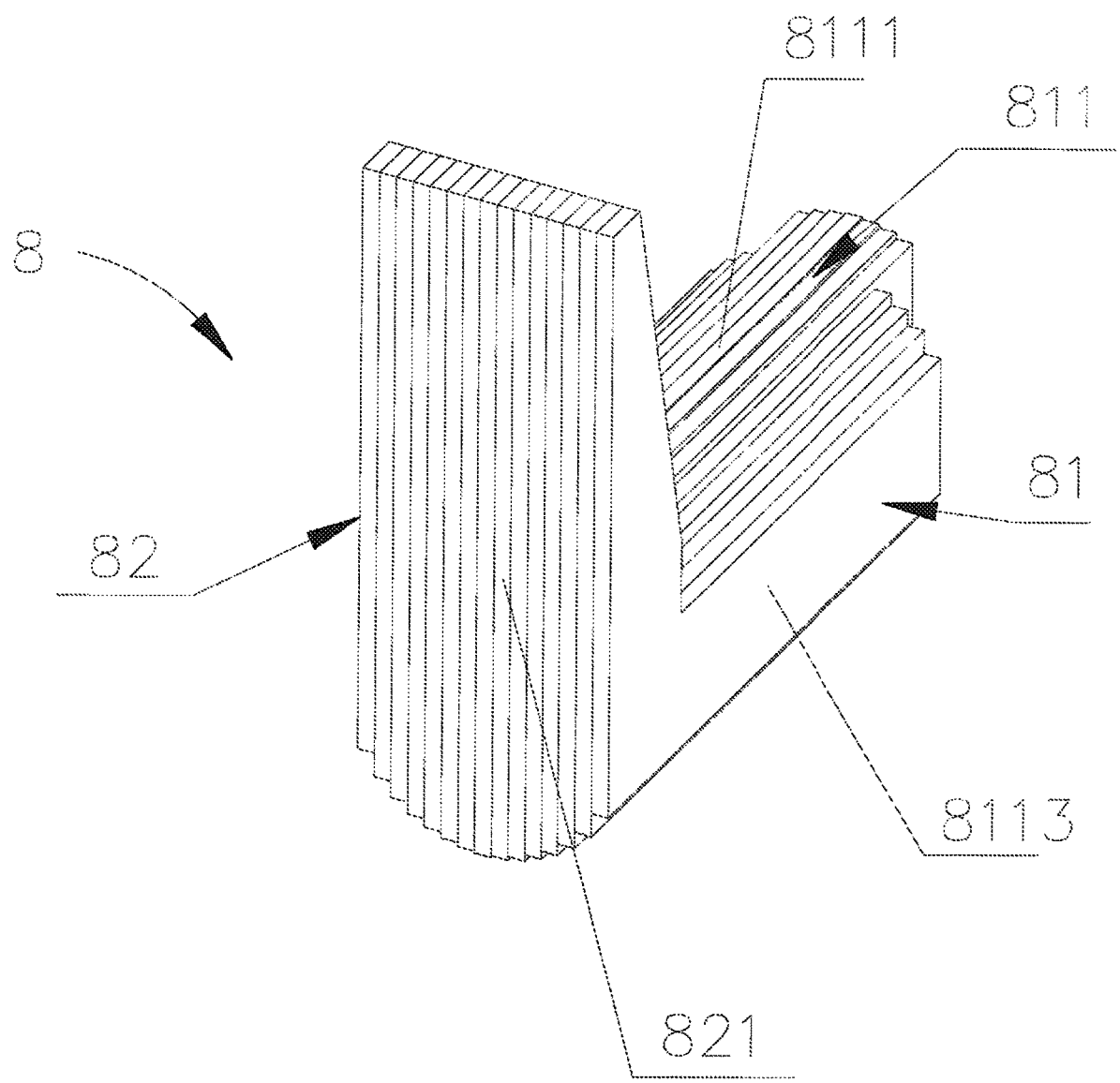
FIG. 19 is a schematic perspective view showing another structure of the tooth of the stator core in FIG. 16.
Figure 20:
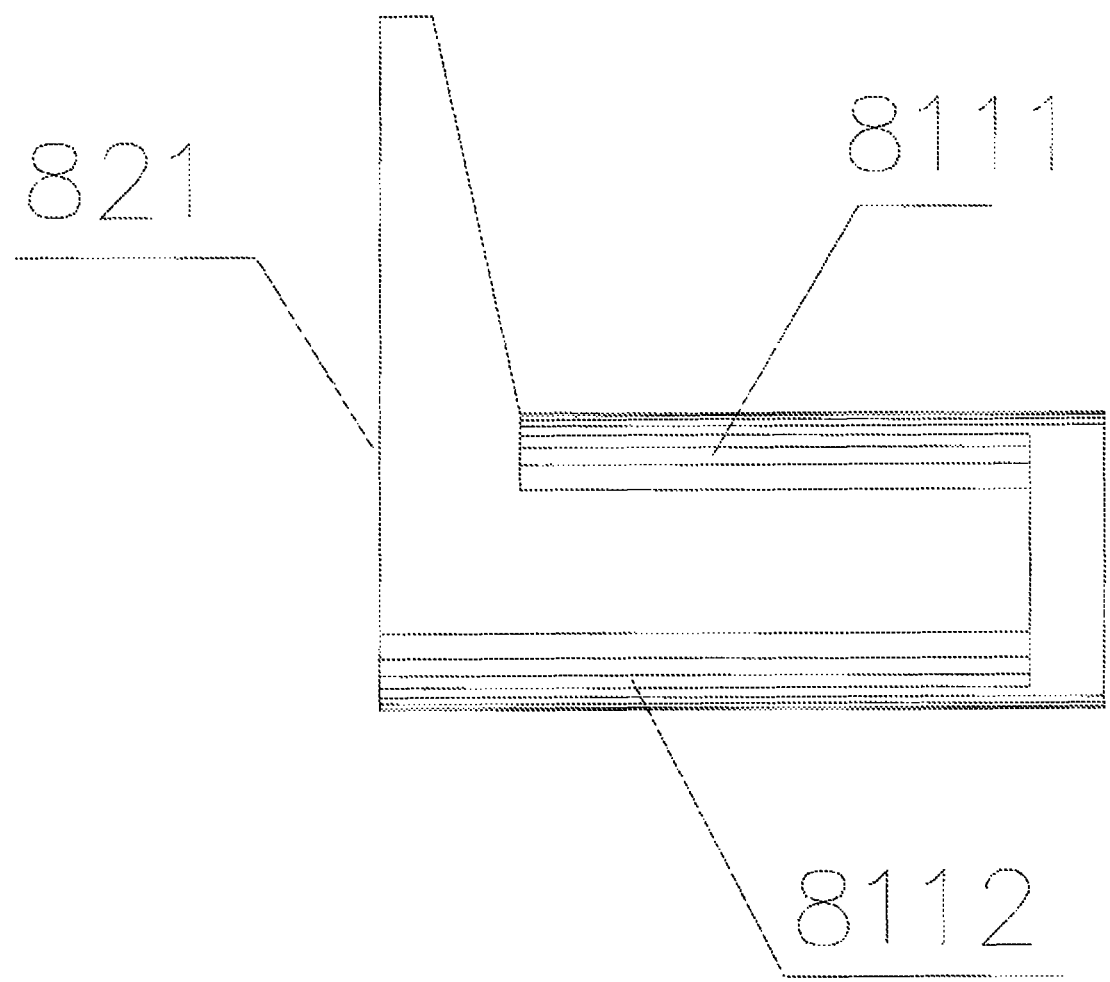
FIG. 20 is a schematic front view showing the structure of the tooth in FIG. 19.

Referring to FIGS. 19 to 20, the tip 82 includes a magnet collecting surface 821. In this embodiment, the magnet collecting surface 821 is of a plane structure, in this way, the magnet collecting surface 821 may serve as a reference for assembling the teeth, which allows the assembling technique of the teeth to be simpler.

Figure 21:
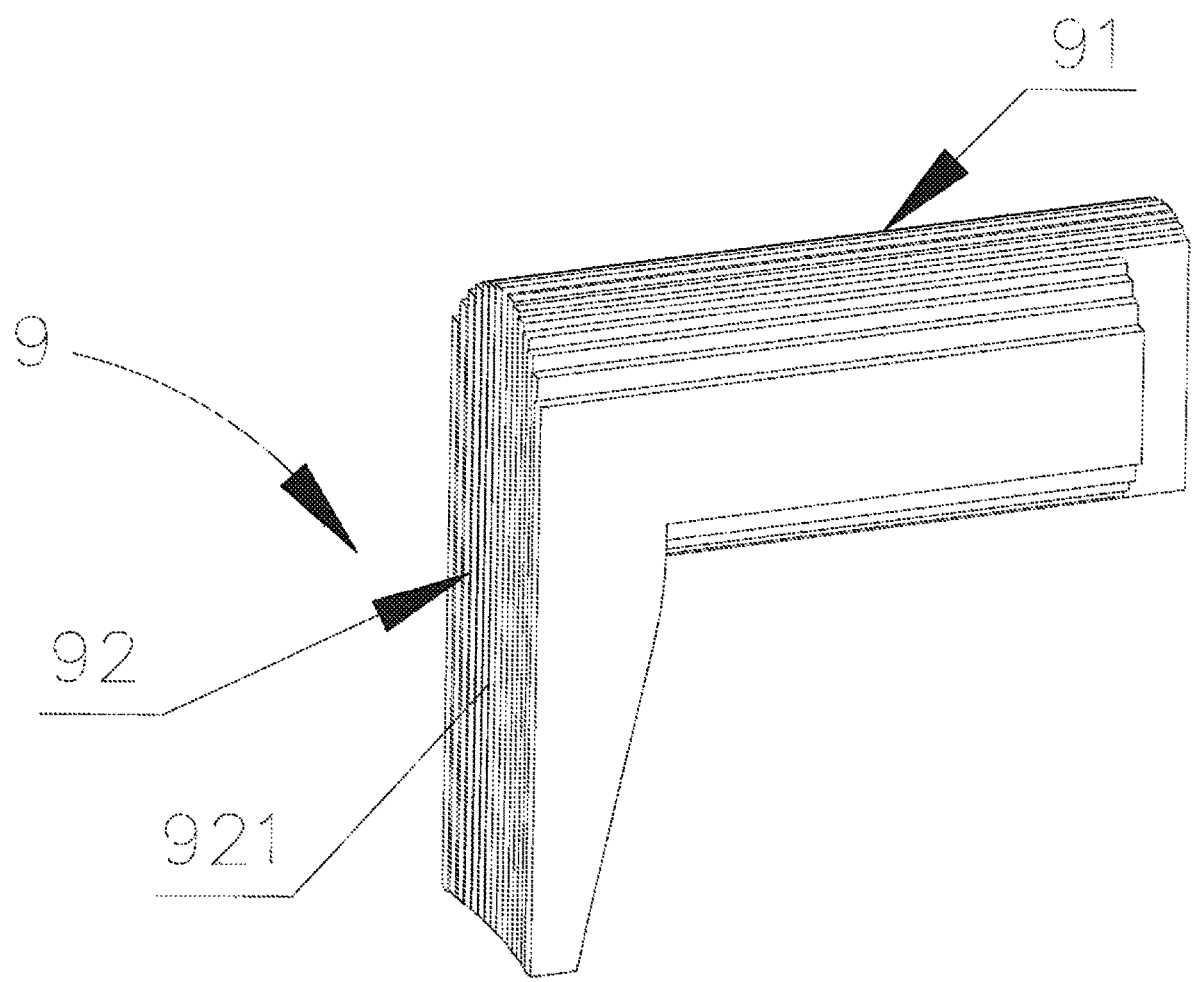
FIG. 21 is a schematic view showing the structure of another embodiment of the tooth of the stator core in FIG. 16.
Figure 22:
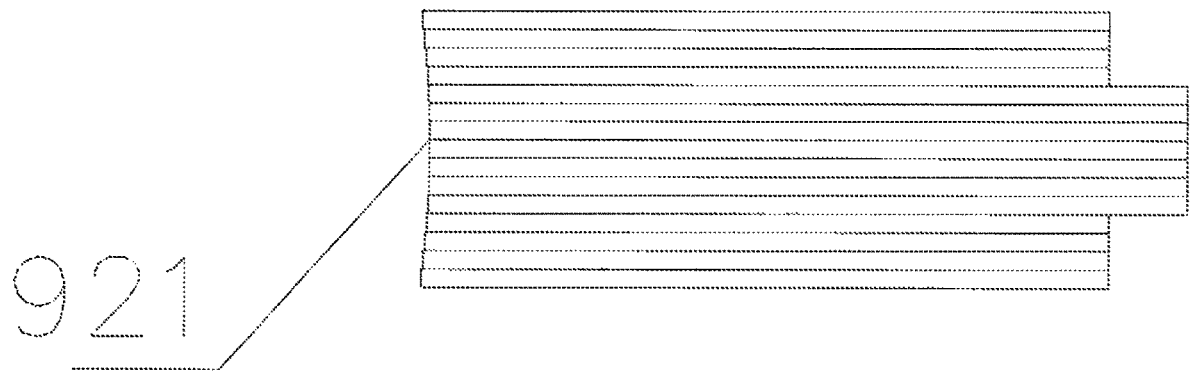
FIG. 22 is a schematic front view showing the structure of the tooth in FIG. 21.

Referring to FIGS. 21 to 22, compared with the teeth 8, each of teeth 9 includes a tip 92, and the tip 92 includes a magnet collecting surface 921. The magnet collecting surface 921 is of a concave structure, and the tip 92 is formed by stacking silicone steel sheets of the teeth 9. In the stacking direction, the silicon steel sheets in the center of the tip are positioned more radially outward than the silicon steel sheets at the edges of the tip, and the magnet collecting surface 921 formed as such is of a concave structure. Such structure may allow the air-gap flux density of the motor applying the stator core to tend to be sine, and facilitate reducing noise of the motor.

It should be noted that, the above embodiments are only intended for describing the present application, and should not be interpreted as limitation to the technical solutions of the present application. Although the present application is described in detail in conjunction with the above embodiments, it should be understood by the person skilled in the art that, modifications or equivalent substitutions may still be made to the present application by the person skilled in the art; and any technical solutions and improvements of the present application without departing from the spirit and scope of the present invention also fall into the scope of the present application defined by the claims.

The invention claimed is:

1. A stator assembly, comprising:
a stator core, and
a winding,
wherein the stator core comprises teeth and a yoke, and the yoke comprises an inner circumferential surface and an outer circumferential surface, and the teeth are arranged and distributed along the inner circumferential surface or the outer circumferential surface of the yoke,
wherein the stator core is formed by stacked silicon steel sheets, and each of the teeth comprises a neck and a tip, and two ends of the neck are respectively connected to the yoke and the tip,
wherein the neck comprises a winding portion that provides support for the winding, and the neck comprises a first stacking portion, a second stacking portion, a first plane portion and a second plane portion, and the first stacking portion and the second stacking portion are arranged opposite to each other, the first plane portion and the second plane portion are arranged opposite to each other, and the first stacking portion and the second stacking portion are formed by stacking silicon steel sheets of the neck,
wherein in a stacking direction of the neck, the first plane portion and the second plane portion are outer surfaces of silicon steel sheets located at two terminal ends of the neck;
wherein in the stacking direction of the silicon steel sheets of the neck, and from the first plane portion and/or the second plane portion to the middle of the winding portion in a height direction, the widths of the silicon steel sheets gradually increase to allow the first stacking portion and the second stacking portion to be in an arc-like shape;
wherein a furthest distance from the first stacking portion to the second stacking portion is a first distance (W), a distance between the first plane portion and the second plane portion is a second distance (H), and the ratio of the second distance to the first distance is greater than or equal to ½ and smaller than or equal to 1,
wherein the tip comprises a first terminal end, a second terminal end, and a magnet collecting surface, and the magnet collecting surface collects a magnetic field, the first terminal end and the second terminal end are located at two ends of the magnet collecting surface, and the first terminal end is arranged to be flush with the first plane portion of the neck,
wherein each of the teeth and the yoke are assembled to be fixed, and a stacking direction of silicon steel sheets of the yoke is same with the stacking direction of the silicon steel sheets of each of the teeth,
the tip comprises a first portion and a second portion which are aligned in an axis direction of the yoke, and the first portion is connected directly to the neck and the second portion is not directly connected to the neck,
the first plane portion of the neck is arranged to be flush with the first portion of the tip, and the second portion of the tip is arranged to protrude out of the second plane portion of the neck.

2. The stator assembly according to claim 1, wherein the neck comprises a middle silicon steel sheet having a maximum width, and the middle silicon steel sheet is located in the middle of the stacked silicon steel sheets of the neck in the height direction, silicon steel sheets at two sides of the middle silicon steel sheet are of the same number and two silicon steel sheets at a same distance from the middle silicon steel sheet at the two sides of the middle silicon steel sheet have the same width, and from the middle silicon steel sheet to the silicon steel sheet of the first plane portion or to the silicon steel sheet of the second plane portion, the widths of the silicon steel sheets of the neck gradually decrease.

3. The stator assembly according to claim 1, wherein the neck comprises at least two middle silicon steel sheets having a maximum width, the middle silicon steel sheets are located in the middle of the stacked silicon steel sheets of the neck in the height direction, silicon steel sheets at two sides of the middle silicon steel sheets are of the same number and two silicon steel sheets at a same distance from the middle silicon steel sheet at the two sides of the middle silicon steel sheet have the same width, and from the middle silicon steel sheets to the silicon steel sheet of the first plane portion or to the silicon steel sheet of the second plane portion, the widths of the silicon steel sheets of the neck gradually decrease.

4. The stator assembly according to claim 1, wherein the stacking direction of the silicon steel sheets of the neck is the same with a stacking direction of silicon steel sheets of the yoke, a silicon steel sheet of the neck and a silicon steel sheet of the yoke in the same layer are an integral silicon steel sheet, and a silicon steel sheet of the first portion and a silicon steel sheet of the neck and a silicon steel sheet of the yoke connected to the neck in the same layer are a same silicon steel sheet.

5. The stator assembly according to claim 4, wherein the silicon steel sheets of the second portion are arranged to be stacked onto the silicon steel sheets of the first portion, and the second portion is fixed to the first portion by riveting.

6. The stator assembly according to claim 1, wherein the yoke and each of the teeth are fixed via an insulation layer, the yoke is provided with a mounting groove, and the neck comprises the winding portion and a mounting portion, the mounting portion comprises a protrusion and a stepped portion, the protrusion and the stepped portion are arranged to fit with the mounting groove and an inner circumferential surface or an outer circumferential surface of the yoke.

7. The stator assembly according to claim 6, wherein in the stacking direction of silicon steel sheets of each of the teeth, a silicon steel sheet of the neck and a silicon steel sheet of the tip in each layer are a same silicon steel sheet, and each of the teeth is fixed integrally by riveting.

8. The stator assembly according to claim 6, wherein in the stacking direction of each of the teeth, a silicon steel sheet of the neck and a silicon steel sheet in part of silicon steel sheets of the tip in the same layer are a same silicon steel sheet, and each of the teeth is fixed integrally by riveting.

9. The stator assembly according to claim 1, wherein a stacking direction of silicon steel sheets of the yoke is an axial direction of the stator core, and each of the teeth is connected to the yoke, adjacent necks are arranged at different heights on the yoke in the axial direction, and alternate necks are arranged at the same height on the yoke in the axial direction.

10. An electric pump, comprising:
a stator assembly,
a housing,
a rotor assembly, and
an electric control board, wherein the housing forms an inner cavity, the rotor assembly and the stator assembly are arranged in the inner cavity, the rotor assembly and the stator assembly are separated from each other by the housing, the stator assembly is arranged around the rotor assembly, the electric control board is arranged to be electrically connected to the stator assembly, and the stator assembly, comprising:

a stator core, and a winding, wherein the stator core comprises teeth and a yoke, and the yoke comprises an inner circumferential surface and an outer circumferential surface, and the teeth are arranged and distributed along the inner circumferential surface or the outer circumferential surface of the yoke, wherein the stator core is formed by stacked silicon steel sheets, and each of the teeth comprises a neck and a tip, and two ends of the neck are respectively connected to the yoke and the tip, wherein the neck comprises a winding portion that provides support for the winding, and the neck comprises a first stacking portion, a second stacking portion, a first plane portion and a second plane portion, and the first stacking portion and the second stacking portion are arranged opposite to each other, the first plane portion and the second plane portion are arranged opposite to each other, and the first stacking portion and the second stacking portion are formed by stacking silicon steel sheets of the neck, wherein in a stacking direction of the neck, the first plane portion and the second plane portion are outer surfaces of silicon steel sheets located at two terminal ends of the neck;

wherein in the stacking direction of the silicon steel sheets of the neck, and from the first plane portion and/or the second plane portion to the middle of the winding portion in a height direction, the widths of the silicon steel sheets gradually increase to allow the first stacking portion and the second stacking portion to be in an arc-like shape;

wherein a furthest distance from the first stacking portion to the second stacking portion is a first distance (W), a distance between the first plane portion and the second plane portion is a second distance (H), and the ratio of the second distance to the first distance is greater than or equal to ½ and smaller than or equal to 1, wherein the tip comprises a first terminal end, a second terminal end, and a magnet collecting surface, and the magnet collecting surface collects a magnetic field, the first terminal end and the second terminal end are located at two ends of the magnet collecting surface, and the first terminal end is arranged to be flush with the first plane portion of the neck, wherein each of the teeth and the yoke are assembled to be fixed, and a stacking direction of silicon steel sheets of the yoke is same with the stacking direction of the silicon steel sheets of each of the teeth, the tip comprises a first portion and a second portion which are aligned in an axis direction of the yoke, and the first portion is connected directly to the neck and the second portion is not directly connected to the neck, the first plane portion of the neck is arranged to be flush with the first portion of the tip, and the second portion of the tip is arranged to protrude out of the second plane portion of the neck.

11. The electric pump according to claim 10, wherein the neck comprises a middle silicon steel sheet having a maximum width, and the middle silicon steel sheet is located in the middle of the stacked silicon steel sheets of the neck in the height direction, silicon steel sheets at two sides of the middle silicon steel sheet are of the same number and two silicon steel sheets at a same distance from the middle silicon steel sheet at the two sides of the middle silicon steel sheet have the same width, and from the middle silicon steel sheet to the silicon steel sheet of the first plane portion or to the silicon steel sheet of the second plane portion, the widths of the silicon steel sheets of the neck gradually decrease.

12. The electric pump according to claim 10, wherein the neck comprises at least two middle silicon steel sheets having a maximum width, the middle silicon steel sheets are located in the middle of the stacked silicon steel sheets of the neck in the height direction, silicon steel sheets at two sides of the middle silicon steel sheets are of the same number and two silicon steel sheets at a same distance from the middle silicon steel sheet at the two sides of the middle silicon steel sheet have the same width, and from the middle silicon steel sheets to the silicon steel sheet of the first plane portion or to the silicon steel sheet of the second plane portion, the widths of the silicon steel sheets of the neck gradually decrease.

13. The electric pump according to claim 10, wherein the stacking direction of the silicon steel sheets of the neck is the same with a stacking direction of silicon steel sheets of the yoke, a silicon steel sheet of the neck and a silicon steel sheet of the yoke in the same layer are an integral silicon steel sheet, and a silicon steel sheet of the first portion and a silicon steel sheet of the neck and a silicon steel sheet of the yoke connected to the neck in the same layer are a same silicon steel sheet.

14. The electric pump according to claim 13, wherein the silicon steel sheets of the second portion are arranged to be stacked onto the silicon steel sheets of the first portion, and the second portion is fixed to the first portion by riveting.

15. A method for manufacturing a stator assembly, wherein:

the stator assembly comprises:

a stator core, and a winding, wherein the stator core comprises teeth and a yoke, and the yoke comprises an inner circumferential surface and an outer circumferential surface, and the teeth are arranged and distributed along the inner circumferential surface or the outer circumferential surface of the yoke, wherein the stator core is formed by stacked silicon steel sheets, and each of the teeth comprises a neck and a tip, and two ends of the neck are respectively connected to the yoke and the tip, wherein the neck comprises a winding portion that provides support for the winding, and the neck comprises a first stacking portion, a second stacking portion, a first plane portion and a second plane portion, and the first stacking portion and the second stacking portion are arranged opposite to each other, the first plane portion and the second plane portion are arranged opposite to each other, and the first stacking portion and the second stacking portion are formed by stacking silicon steel sheets of the neck, wherein the tip comprises a first terminal end, a second terminal end, and a magnet collecting surface, and the magnet collecting surface collects a magnetic field, the first terminal end and the second terminal end are located at two ends of the magnet collecting surface, and the first terminal end is arranged to be flush with the first plane portion of the neck, wherein each of the teeth and the yoke are assembled to be fixed, and a stacking direction of silicon steel sheets of the yoke is same with the stacking direction of the silicon steel sheets of each of the teeth, the tip comprises a first portion and a second portion which are aligned in an axis direction of the yoke, and the first portion is connected directly to the neck and the second portion is not directly connected to the neck, the first plane portion of the neck is arranged to be flush with the first portion of the tip, and the second portion of the tip is arranged to protrude out of the second plane portion of the neck, a forming process of the stator assembly comprises:

forming a yoke comprises blanking a plurality of first silicon steel sheets of the yoke and stacking and riveting the plurality of first silicon steel sheets, forming teeth comprises blanking a plurality of second silicon steel sheets of a neck and the first portion of the tip and stacking and riveting the plurality of second silicon steel sheets, and blanking a plurality of third silicon steel sheets of the second portion of the tip and stacking the plurality of third silicon steel sheets on the plurality of second silicon steel sheets and riveting the plurality of third silicon steel sheets to the plurality of the second silicon steel sheets, forming a stator core comprises injection molding the yoke and the teeth by an insulating layer.

* * * * *